United States Patent
He et al.

(10) Patent No.: US 11,520,481 B2
(45) Date of Patent: Dec. 6, 2022

(54) TOUCH DISPLAY SCREEN OPERATION METHOD AND USER EQUIPMENT

(71) Applicant: HUAWEI TECHNOLOGIES CO., LTD., Guangdong (CN)

(72) Inventors: Zhen He, Shenzhen (CN); Yong Zheng, Dongguan (CN); Maosheng Huang, Shenzhen (CN); Tao Wang, Shenzhen (CN); Ding Zhong, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/351,644

(22) Filed: Jun. 18, 2021

(65) Prior Publication Data
US 2021/0311573 A1  Oct. 7, 2021

Related U.S. Application Data

(63) Continuation of application No. PCT/CN2019/124122, filed on Dec. 9, 2019.

(30) Foreign Application Priority Data

Dec. 19, 2018 (CN) .......................... 201811557170.4

(51) Int. Cl.
*G06F 3/04886* (2022.01)
*G06F 3/04842* (2022.01)
*G06F 3/0354* (2013.01)

(52) U.S. Cl.
CPC ...... *G06F 3/04886* (2013.01); *G06F 3/03547* (2013.01); *G06F 3/04842* (2013.01)

(58) Field of Classification Search
CPC ............. G06F 3/03547; G06F 3/04842; G06F 3/04886; G06F 3/0487; G06F 3/0412; G06F 3/0416
See application file for complete search history.

(56) References Cited

U.S. PATENT DOCUMENTS

| | | | |
|---|---|---|---|
| 2010/0194706 A1 | 8/2010 | Watanabe et al. | |
| 2014/0040826 A1 | 2/2014 | Wei et al. | |
| 2014/0152593 A1* | 6/2014 | Wu | G06F 3/04886 |
| | | | 345/173 |
| 2015/0058729 A1 | 2/2015 | Hayes | |

(Continued)

FOREIGN PATENT DOCUMENTS

| AU | 2018200747 A1 | 2/2018 |
|---|---|---|
| CN | 104461369 A | 3/2015 |
| CN | 104965669 A | 10/2015 |

(Continued)

*Primary Examiner* — David Tung
(74) *Attorney, Agent, or Firm* — Womble Bond Dickinson (US) LLP

(57) ABSTRACT

In one embodiment, a sliding track of a user is detected on a shortcut touchpad of user equipment to identify a sliding direction of the sliding track. The sliding direction is matched to an interaction interface of the user equipment. One or more objects, such as an icon or an input box, are determined on a touch display screen of the user equipment based on the sliding direction of the sliding track entered by the user. The shortcut touchpad may be made to be relatively small, facilitating a one-hand operation of the user and improving user experience.

17 Claims, 16 Drawing Sheets

(56) References Cited

U.S. PATENT DOCUMENTS

2015/0149954 A1\* 5/2015 Lin .................... G06F 3/04817
                                                                715/781
2018/0046349 A1\* 2/2018 Chan .................. G06F 3/04817

FOREIGN PATENT DOCUMENTS

| CN | 105320448 | A  | 2/2016  |
| CN | 105549813 | A  | 5/2016  |
| CN | 106161678 | A  | 11/2016 |
| CN | 106227375 | A  | 12/2016 |
| CN | 106227457 | A  | 12/2016 |
| CN | 106250037 | A  | 12/2016 |
| CN | 106527903 | A  | 3/2017  |
| WO | 2017181540 | A1 | 10/2017 |

\* cited by examiner

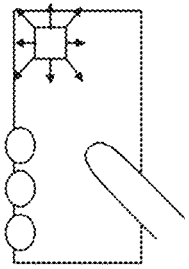
FIG. 6(a)
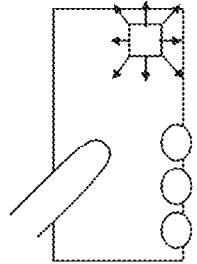
FIG. 6(b)
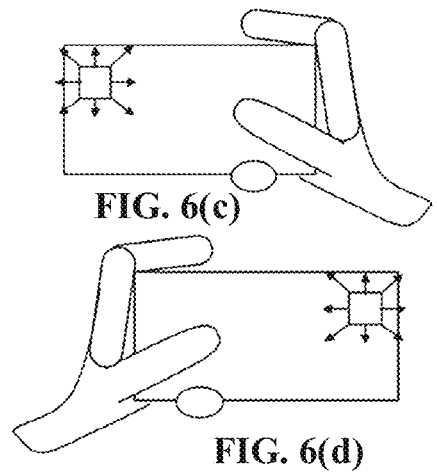
FIG. 6(c)
FIG. 6(d)
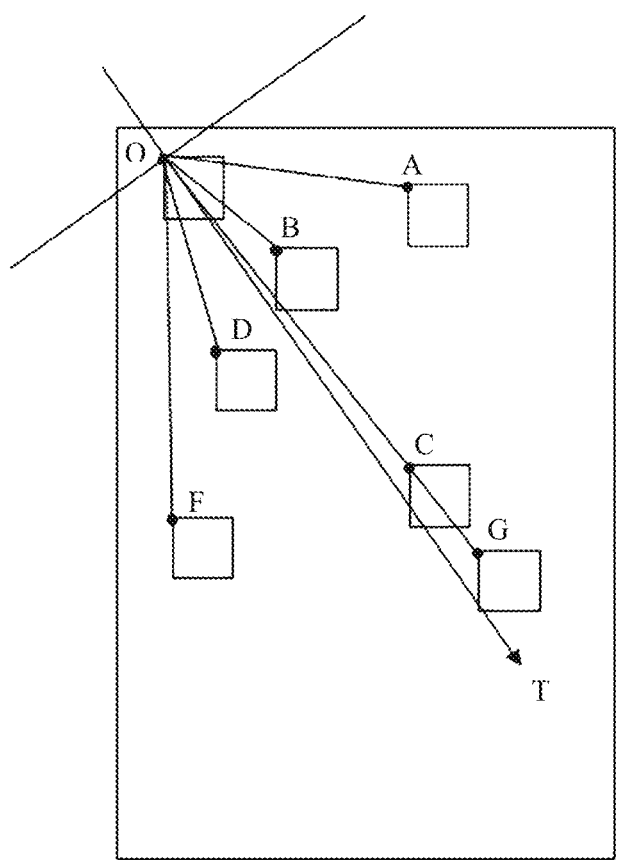
(a) Touch display screen
FIG. 7(a)
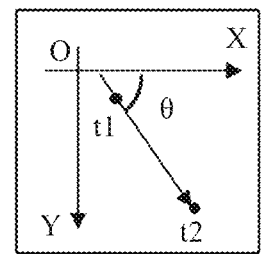
(b) Shortcut touchpad
FIG. 7(b)

TOUCH DISPLAY SCREEN OPERATION METHOD AND USER EQUIPMENT

CROSS-REFERENCE TO RELATED APPLICATIONS

This application is a continuation of International Application No. PCT/CN2019/124122, filed on Dec. 9, 2019, which claims priority to Chinese Patent Application No. 201811557170.4, filed on Dec. 19, 2018. The disclosures of the aforementioned applications are hereby incorporated by reference in their entireties.

TECHNICAL FIELD

This application relates to the field of electronic and communications technologies, and in particular, to the field of human-computer interaction technologies.

BACKGROUND

Currently, some portable user equipment use a touch display screen, and a user needs to perform, on the touch display screen, an operation on content displayed on the touch display screen, for example, tap an icon, enter a text, or select a picture. These portable user equipment may be a mobile phone, a tablet computer, a personal computer (PC), a personal digital assistant (PDA), a smartwatch, a netbook, a wearable electronic device, or the like on which an application program can be installed and an application program icon can be displayed.

A mobile phone 200 shown in FIG. 1(b) is used as an example. When a touch display screen is relatively large, some touch regions cannot be reached due to a limited length of a thumb, causing inconvenience in an operation. For example, a left hand in FIG. 1(a) cannot reach an icon 01 of an application "China Merchants Bank", and a right hand shown in FIG. 1(b) cannot reach an icon 02 of an application "Photos".

SUMMARY

In view of this, embodiments of this application provide a touch display screen operation method and user equipment, so that a user can operate, with one hand, user equipment having a relatively large touch display screen.

According to a first aspect, this application provides a first touch display screen operation method, where the method includes:

S110 of receiving, on a shortcut touchpad, a sliding operation entered by a user, and identifying a sliding direction of the sliding operation;

S120 of determining, on a touch display screen by using a first input region as a start point, a second input region in a region indicated by the sliding direction, and the second input region displayed on the touch display screen enters a selected state, wherein the first input region and the second input region are two of three or more input regions displayed on the touch display screen; and

S130 of receiving information entered by the user for the second input region.

By providing a shortcut touchpad of user equipment, and by detecting a sliding track of a user on the shortcut touchpad, the user equipment can identify a sliding direction of the sliding track. The detected sliding direction is mapped to an interaction interface of user equipment. By using the first input region as a reference point and based on the sliding direction of the sliding track entered by the user, the user equipment can predict that the user expects to select an input region from a region along the direction. Therefore, the second input region is selected in the region along the direction, and the selected second input region is enabled to enter the selected state. The user does not need to enter a long sliding track, provided that the user equipment can identify a sliding direction. Because there is no requirement on a length of the sliding track, the user may perform an operation on the shortcut touchpad with a thumb, so that the user can operate the user equipment with one hand, improving user experience.

The sliding operation of the user on the shortcut touchpad is matched to the interaction interface of the user equipment, so that switching can be freely performed between a plurality of input regions of the interaction interface. In this way, no direct operation is required on the interaction interface, and the interaction interface may be made to be larger, to achieve visual enjoyment for the user.

The shortcut touchpad is disposed so that the user equipment has two working modes. One is operating the interaction interface by applying a touch instruction on the shortcut touchpad, and the other is operating the interaction interface by applying a touch instruction on the interaction interface. In addition, the user may select either of the two working modes for free switching, to meet the user's usage requirements in different scenarios.

In an embodiment, the determining, by using a first input region as a start point, a second input region from a region indicated by the sliding direction includes: determining a reference direction on the touch display screen based on the sliding direction, and determining the second input region from a region that uses the first input region as a start point and that is along the reference direction.

In an embodiment, the input region is a region that is displayed on the interaction interface of the touch display screen and in which the user can enter various types of touch operation information.

In an embodiment, the input region is an application icon on a desktop wallpaper, an input dialog box, an input button, a drop-down notification bar, or various graphic elements.

In an embodiment, the touch display screen and the shortcut touchpad in the user equipment are separately disposed.

In an embodiment, the touch display screen is disposed on a front surface of the user equipment, and the shortcut touchpad is disposed on the front surface, a rear surface, or a side surface of the user equipment.

In an embodiment, the touch display screen is integrated with the shortcut touchpad, and the shortcut touchpad is located in a region of a corner part of the touch display screen.

In an embodiment, when the shortcut touchpad is located in the region of the corner part of the touch display screen, the first input region and the second input region are located in a region outside the shortcut touchpad.

In an embodiment, when the shortcut touchpad is located in the region of the corner part of the touch display screen, all input regions displayed on the touch display screen are located in a region outside the shortcut touchpad.

In an embodiment, in operation S120, when the shortcut touchpad is located in the region of the corner part of the touch display screen, when the second input region is selected, an input region in a region in which the shortcut touchpad is located is beyond a selection range.

In an embodiment, in operation S120, when the shortcut touchpad is located in the region of the corner part of the touch display screen, the first input region is at a location that is on the touch display screen and that is far away from the shortcut touchpad.

In an embodiment, in operation S120, when the shortcut touchpad is located in the region of the corner part of the touch display screen, the first input region is located at a corner location farthest away from the shortcut touch touchpad.

In an embodiment, before operation S110, the method may further include:

S108 of activating a part of a region of the touch display screen as the shortcut touchpad based on a detected trigger signal.

In an embodiment, operation S108 includes: activating, as the shortcut touchpad based on the detected trigger signal and a holding gesture of the user, a region that is on the touch display screen and that is close to a palm of the user.

In an embodiment, an area occupied by the shortcut touchpad on a surface of the user equipment is less than that occupied by the touch display screen on the surface of the user equipment.

An intuitive feeling of the user is that the shortcut touchpad is smaller than the touch display screen. Because the shortcut touchpad is relatively small, the shortcut touchpad may be operated with one hand.

In an embodiment, a manner of determining the reference direction on the touch display screen based on the sliding direction in operation S120 includes:

first manner: identifying an included angle between the sliding direction and a horizontal coordinate axis of the shortcut touchpad, and determining the reference direction based on the included angle, where a magnitude of an included angle between the reference direction and a horizontal coordinate axis of the touch display screen is equal to a magnitude of the included angle between the sliding direction and the horizontal coordinate axis of the shortcut touchpad; or second manner: identifying an included angle between the sliding direction and a vertical coordinate axis of the shortcut touchpad, and determining the reference direction based on the included angle, where a magnitude of an included angle between the reference direction and a vertical coordinate axis of the touch display screen is equal to a magnitude of the included angle between the sliding direction and the vertical coordinate axis of the shortcut touchpad.

In an embodiment, when the shortcut touchpad is located on a front surface or a rear surface of the user equipment, the horizontal coordinate axis of the shortcut touchpad and the horizontal coordinate axis of the touch display screen are parallel and in a same direction, the vertical coordinate axis of the shortcut touchpad and the vertical coordinate axis of the touch display screen are parallel and in a same direction, and the reference direction and the sliding direction are parallel and in a same direction.

Although the sliding direction is determined on the touch display screen, because the sliding direction and the reference direction are parallel and in a same direction, the user feels like that the sliding operation is directly performed on the touch display screen, and easily masters an operation skill.

In an embodiment, when the shortcut touchpad is located on a left-side bezel of the user equipment, a manner of setting the coordinate axes of the shortcut touchpad and the touch display screen includes:

first manner: the vertical coordinate axis of the shortcut touchpad and the vertical coordinate axis of the touch display screen are parallel and in a same direction, the horizontal coordinate axis of the shortcut touchpad extends from a rear part of the user equipment to a front part of the user equipment, and the horizontal coordinate axis of the touch display screen extends from a left side of the user equipment to a right side of the user equipment; or second manner: the vertical coordinate axis of the shortcut touchpad and the vertical coordinate axis of the touch display screen are parallel and in a same direction, the horizontal coordinate axis of the shortcut touchpad extends from a front part of the user equipment to a rear part of the user equipment, and the horizontal coordinate axis of the touch display screen extends from a right side of the user equipment to a left side of the user equipment.

In an embodiment, when the shortcut touchpad is located on a right-side bezel of the user equipment, a manner of setting the coordinate axes of the shortcut touchpad and the touch display screen includes:

first manner: the vertical coordinate axis of the shortcut touchpad and the vertical coordinate axis of the touch display screen are parallel and in a same direction, the horizontal coordinate axis of the shortcut touchpad extends from a rear part of the user equipment to a front part of the user equipment, and the horizontal coordinate axis of the touch display screen extends from a right side of the user equipment to a left side of the user equipment; or second manner: the vertical coordinate axis of the shortcut touchpad and the vertical coordinate axis of the touch display screen are parallel and in a same direction, the horizontal coordinate axis of the shortcut touchpad extends from a front part of the user equipment to a rear part of the user equipment, and the horizontal coordinate axis of the touch display screen extends from a left side of the user equipment to a right side of the user equipment.

Because the user performs the sliding operation on the shortcut touchpad, and the user equipment responds on the touch display screen, the user is likely to have some illusions and feel unconformable. When the shortcut touchpad is located on a side bezel, the horizontal coordinate axis and the vertical coordinate axis are set in the foregoing manners, so that discomfort of the user can be relieved to some extent.

In an embodiment, the using the first input region as a start point in operation S120 is using any point in the first input region as the start point.

In an embodiment, in operation S120, the start point is any vertex in the first input region or a center point in the first input region.

In an embodiment, in operation S120, when the second input region is selected, the first input region is in a selected state, and operation S120 further includes:

when or before the second input region is enabled to enter a selected state, enabling the first input region to enter a non-selected state.

In an embodiment, rays on the touch display screen whose endpoints are located at the start point, that are located on two sides of the reference direction, and that have an included angle of x degrees with the reference direction are first rays; rays whose endpoints are located at the start point, that are located on the two sides of the reference direction, and that have an included angle of y degrees with the reference direction are second rays; a region between the first rays on the touch display screen is a first region; a region between a first ray and a second ray on the touch display screen that are located on a same side of the reference direction is a second region, where $0<x<45$, $0<y<45$, and $x<y$; and in the determining the second input region from a region that uses the first input region as a start point and that is along the reference direction in operation S120, a specific determining manner includes:

first manner: determining the second input region from an input region in the first region; or second manner: determining the second input region from an input region in the second region.

In an embodiment, in operation S120, in the manner of selecting the second input region from the first region, when there is only one input region in the first region, the input region is used as the second input region; or when there are two or more input regions in the first region, an input region having a smallest included angle with the reference direction is selected, as the second input region, from the input regions in the first region, where the included angle between the input region and the reference direction is an included angle between the reference direction and a connection line from the start point to the input region; or when there are two or more input regions having a smallest included angle with the reference direction, an input region closest to the start point is selected, as the second input region, from the two or more input regions having a smallest included angle with the reference direction.

In an embodiment, in operation S120, in the manner of selecting the second input region from the second region, when there is only one input region in the second region, the input region is used as the second input region; or when there are two or more input regions in the second region, an input region closest to the start point is selected, as the second input region, from the input regions in the second region; or when there are two or more input regions closest to the start point, an input region having a smallest included angle with the reference direction is selected, as the second input region, from the two or more input regions closest to the start point.

In an embodiment, a distance between the input region and the start point is a distance from the start point to a connection point in the input region, the connection line between the start point and the input region is a connection line between the start point and the connection point in the input region, and the connection point is any point in the input region.

In an embodiment, the connection point is a vertex or a center point of the input region.

In an embodiment, regions occupied on the touch display screen by the input regions displayed on the touch display screen have a same shape or similar shapes, and have an equal size.

In an embodiment, a location of the start point in the first input region is the same as or similar to a location of the connection point in another input region.

In an embodiment, that the input region is located in the first region means that a connection point of the input region is located in the first region.

In an embodiment, that the input region is located in the second region means that a connection point of the input region is located in the second region.

According to a second aspect, this application provides first user equipment, where the user equipment includes:

a shortcut touchpad, configured to receive a sliding operation entered by a user;

an identification circuit, configured to identify a sliding direction of the sliding operation; and a processor, configured to determine, on the touch display screen by using a first input region as a start point, a second input region from a region indicated by the sliding direction, where the first input region and the second input region are two of three or more input regions displayed on the touch display screen, where the touch display screen is further configured to display that the second input region enters a selected state; and the touch display screen or the shortcut touchpad is further configured to receive information entered by the user for the second input region.

In an embodiment, the identification circuit may be integrated with the processor, or the identification circuit is integrated with the shortcut touchpad.

In an embodiment, the touch display screen is further configured to enable, according to an instruction of the processor, the second input region to enter a selected state.

In an embodiment, the touch display screen is further configured to activate a part of a region as the shortcut touchpad based on a detected trigger signal.

In an embodiment, the processor is further configured to instruct, based on the detected trigger signal, the touch display screen to activate a part of a region as the shortcut touchpad.

In an embodiment, the processor is further configured to instruct, based on the detected trigger signal and a holding gesture of the user, the touch display screen to activate a region close to a palm of the user as the shortcut touchpad.

For various embodiments of the shortcut touchpad in the user equipment in the second aspect, refer to various embodiments of operations S110 and S130 in the first aspect.

For various embodiments of the identification circuit in the user equipment in the second aspect, refer to various implementations of operation S110 in the first aspect.

For various embodiments of the processor in the user equipment in the second aspect, refer to various embodiments of operation S120 in the first aspect.

For various embodiments of the touch display screen in the user equipment in the second aspect, refer to various embodiments of operation S120 and operation S130 in the first aspect.

According to a third aspect, this application further provides a second touch display screen operation method, where the method includes:

S210 of receiving, on a shortcut touchpad, a sliding operation entered by a user, and identifying a sliding direction of the sliding operation;

S220 of determining, on a touch display screen by using an initial input region as a start point, a target input region from a region indicated by the sliding direction, where the initial input region and the target input region are two of three or more input regions displayed on the touch display screen;

S230 of repeatedly performing operation S210 and operation S220 N times, where when operation S220 is performed for the first time, a specified input region is used as a start point, and a target input region is selected from a region to which a reference direction using the start point as an endpoint points, and when operation S220 is performed for the second time and each time after the second time, a target input region selected last time is used as a start point, and another target input region is selected from a region to which a reference direction using the start point as an endpoint points, where N is a natural number greater than or equal to 2;

S240 of the target input region displayed on the touch display screen enters a selected state; and S250 of receiving information entered by the user for the target input region.

In an embodiment, operation S240 may include: enabling, by the touch display screen according to an instruction of a processor, the target input region to enter the selected state.

For various embodiments of operation S210 of the touch display screen operation method in the third aspect, refer to various embodiments of operation S110 in the first aspect.

For various embodiments of operation S220 and operation S240 of the touch display screen operation method in the third aspect, refer to various embodiments of operation S120 in the first aspect.

For various embodiments of operation S250 of the touch display screen operation method in the third aspect, refer to various embodiments of operation S130 in the first aspect.

According to a fourth aspect, this application further provides second user equipment, where user equipment includes a shortcut touchpad, an identification circuit, a touch display screen, and a processor, where the shortcut touchpad, the identification circuit, the touch display screen, and the processor are jointly configured to perform an operation of selecting a second input region N times, and in each operation of selecting a second input region, the shortcut touchpad is configured to receive a sliding operation entered by a user, the identification circuit is configured to identify a sliding direction of the sliding operation, and the processor is configured to determine, on the touch display screen by using an initial input region as a start point, a target input region from a region indicated by the sliding direction, where the initial input region and the target input region are two of three or more input regions displayed on the touch display screen;

in an operation of selecting a second input region for the first time, a specified input region is used as a start point, and a target input region is selected from a region to which a reference direction using the start point as an endpoint points;

in an operation of selecting a second input region for the second time and each time after the second time, a target input region selected last time is used as a start point, and another target input region is selected from a region to which a reference direction using the start point as an endpoint points, where N is a natural number greater than or equal to 2;

the touch display screen is further configured to display that the target input region enters a selected state; and the touch display screen or the shortcut touchpad is further configured to receive information entered by the user for the target input region.

In an embodiment the identification circuit may be integrated with the processor, or the identification circuit is integrated with the shortcut touchpad.

For various embodiments of the shortcut touchpad in the user equipment in the fourth aspect, refer to various embodiments of operations S210 and S250 in the third aspect.

For various embodiments of the identification circuit in the user equipment in the fourth aspect, refer to various embodiments of operation S210 in the third aspect.

For various embodiments of the processor in the user equipment in the fourth aspect, refer to various embodiments of operations S220 and S230 in the third aspect.

For various embodiments of the touch display screen in the user equipment in the fourth aspect, refer to various embodiments of operations S220, S230, S240, and S250 in the third aspect.

According to a fifth aspect, this application provides a third touch display screen operation method, where the method includes:

S310 of receiving, on a shortcut touchpad, a sliding operation entered by a user, and identifying a sliding direction of the sliding operation by using an identification circuit;

S320 of determining, on the touch display screen by using an initial input region as a start point, a target input region from a region indicated by the sliding direction, where the target input region displayed on the touch display screen enters a selected state, and the initial input region and the target input region are two of three or more input regions displayed on the touch display screen;

S330 of repeatedly performing operation S310 and operation S320 M times, where when operation S320 is performed for the first time, a specified input region is used as a start point, and a target input region is selected from a region to which a reference direction using the start point as an endpoint points, and when operation S320 is performed for the second time and each time after the second time, a target input region selected last time is used as a start point, and another target input region is selected from a region to which a reference direction using the start point as an endpoint points, where M is a natural number greater than or equal to 2; and S340 of receiving information entered by the user for the target input region.

In an embodiment, in operation S320, that the target input region displayed on the touch display screen enters a selected state includes: enabling, by the touch display screen according to an instruction of a processor, the target input region to enter the selected state.

In an embodiment, the identification circuit may be integrated with the processor, or the identification circuit is integrated with the shortcut touchpad.

For various embodiments of operation S310 of the touch display screen operation method in the fifth aspect, refer to various embodiments of operation S110 in the first aspect.

For various embodiments of operation S320 of the touch display screen operation method in the fifth aspect, refer to various embodiments of operation S120 in the first aspect.

For various embodiments of operation S340 of the touch display screen operation method in the fifth aspect, refer to various embodiments of operation S130 in the first aspect.

According to a sixth aspect, this application further provides third user equipment, where user equipment includes a shortcut touchpad, an identification circuit, a touch display screen, and a processor, where the shortcut touchpad, the identification circuit, the touch display screen, and the processor are jointly configured to perform an operation of selecting a second input region M times, and in each operation of selecting a second input region, the shortcut touchpad is configured to receive a sliding operation entered by a user, the identification circuit is configured to identify a sliding direction of the sliding operation, and the processor is configured to determine, on the touch display screen by using an initial input region as a start point, a target input region from a region indicated by the sliding direction, where the target input region displayed on the touch display screen enters a selected state, and the initial input region and the target input region are two of three or more input regions displayed on the touch display screen;

in an operation of selecting a second input region for the first time, a specified input region is used as a start point, and a target input region is selected from a region to which a reference direction using the start point as an endpoint points;

in an operation of selecting a second input region for the second time and each time after the second time, a target input region selected last time is used as a start point, and another target input region is selected from a region to which a reference direction using the start point as an endpoint points, where M is a natural number greater than or equal to 2; and the touch display screen or the shortcut touchpad further receives information entered by the user for the target input region.

In an embodiment, the identification circuit may be integrated with the processor, or the identification circuit is integrated with the shortcut touchpad.

For various embodiments of the shortcut touchpad in the user equipment in the sixth aspect, refer to various embodiments of operations S310 and S340 in the fifth aspect.

For various embodiments of the identification circuit in the user equipment in the sixth aspect, refer to various embodiments of operation S310 in the fifth aspect.

For various embodiments of the processor in the user equipment in the sixth aspect, refer to various embodiments of operations S320 and S330 in the fifth aspect.

For various embodiments of the touch display screen in the user equipment in the sixth aspect, refer to various embodiments of operations S320, S330, and S340 in the fifth aspect.

BRIEF DESCRIPTION OF DRAWINGS

FIG. 6(a) is a schematic diagram of a first input region being located in an upper left corner of the touch display screen when a mobile terminal is vertically held according to an embodiment of a first touch display screen operation method in this application;

FIG. 6(b) is a schematic diagram of a first input region being located in an upper right corner of the touch display screen when a mobile terminal is vertically held according to an embodiment of a first touch display screen operation method in this application;

FIG. 6(c) is a schematic diagram of a first input region being located in an upper left corner of the touch display screen when a mobile terminal is horizontally held according to an embodiment of a first touch display screen operation method in this application;

FIG. 6(d) is a schematic diagram of a first input region being located in an upper right corner of the touch display screen when a mobile terminal is horizontally held according to an embodiment of a first touch display screen operation method in this application;

FIG. 7(a) is a schematic diagram of input regions and a reference direction on the touch display screen according to an embodiment of a first touch display screen operation method in this application;

FIG. 7(b) is a schematic diagram of a sliding direction on the shortcut touchpad according to an embodiment of a first touch display screen operation method in this application;

DESCRIPTION OF EMBODIMENTS

Embodiments of this application may be applied to various user equipment with a relatively large touch display screen. When the touch display screen is relatively large, a user cannot conveniently perform an operation with one hand. In this application, the user may perform an operation on a shortcut touchpad to resolve this problem to some extent.

The user equipment may be a wearable device, an in-vehicle terminal, a personal mobile terminal, a personal computer, a multimedia player, an electronic reader, a smart home device, a robot, or the like. The personal mobile terminal may also be a smartphone (also referred to as a mobile phone), a tablet computer, or the like. The wearable device may also be a smart band, a smart medical device, a head-mounted terminal, or the like. The head-mounted terminal may be a virtual reality terminal, an augmented reality terminal, or the like, for example, Google Glass. The smart medical device may be a smart blood pressure measurement device, a smart blood glucose measurement device, or the like. The smart home device may be a smart access control system or the like. The robot may be any other electronic device that serves a human according to an instruction of the human, or the like.

Figure 1A:
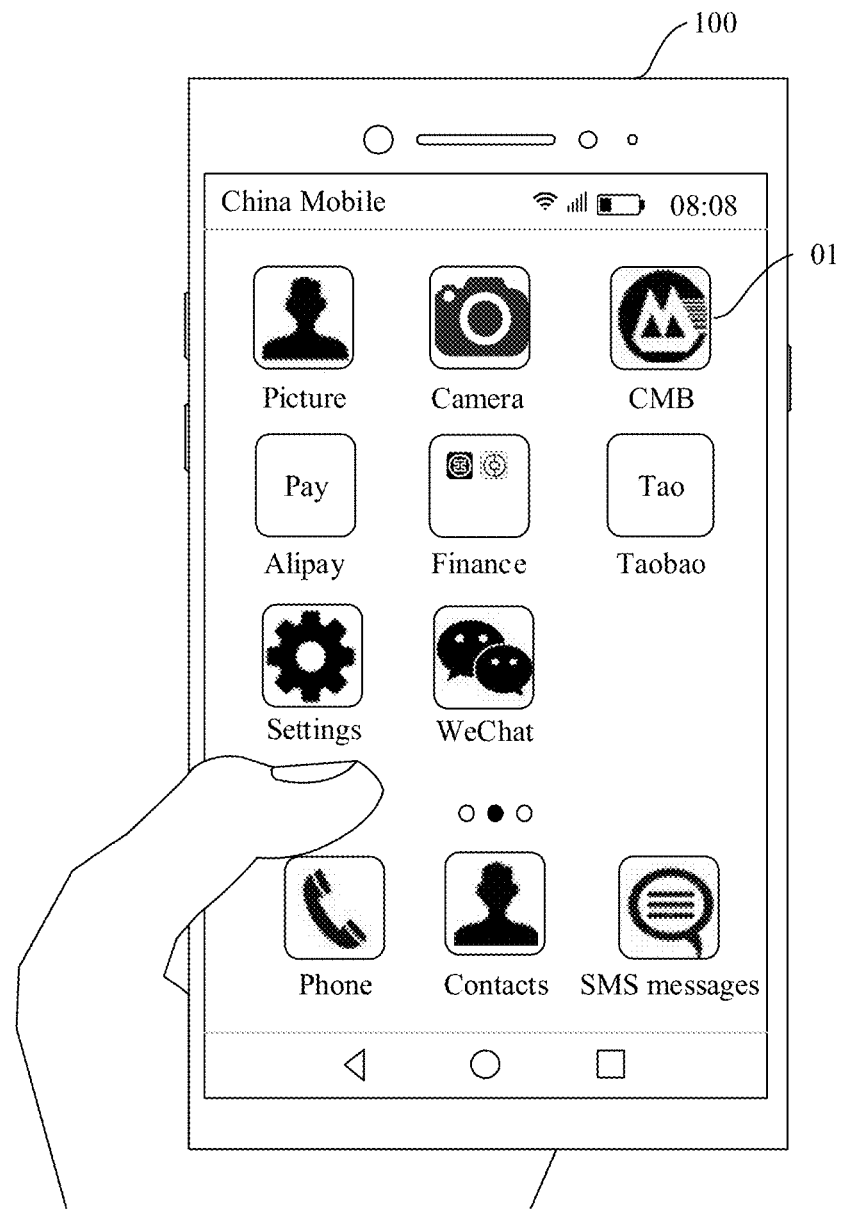
FIG. 1(a) and FIG. 1(b) are schematic diagrams of a relatively large touch display screen of a mobile phone in the prior art.
Figure 1B:
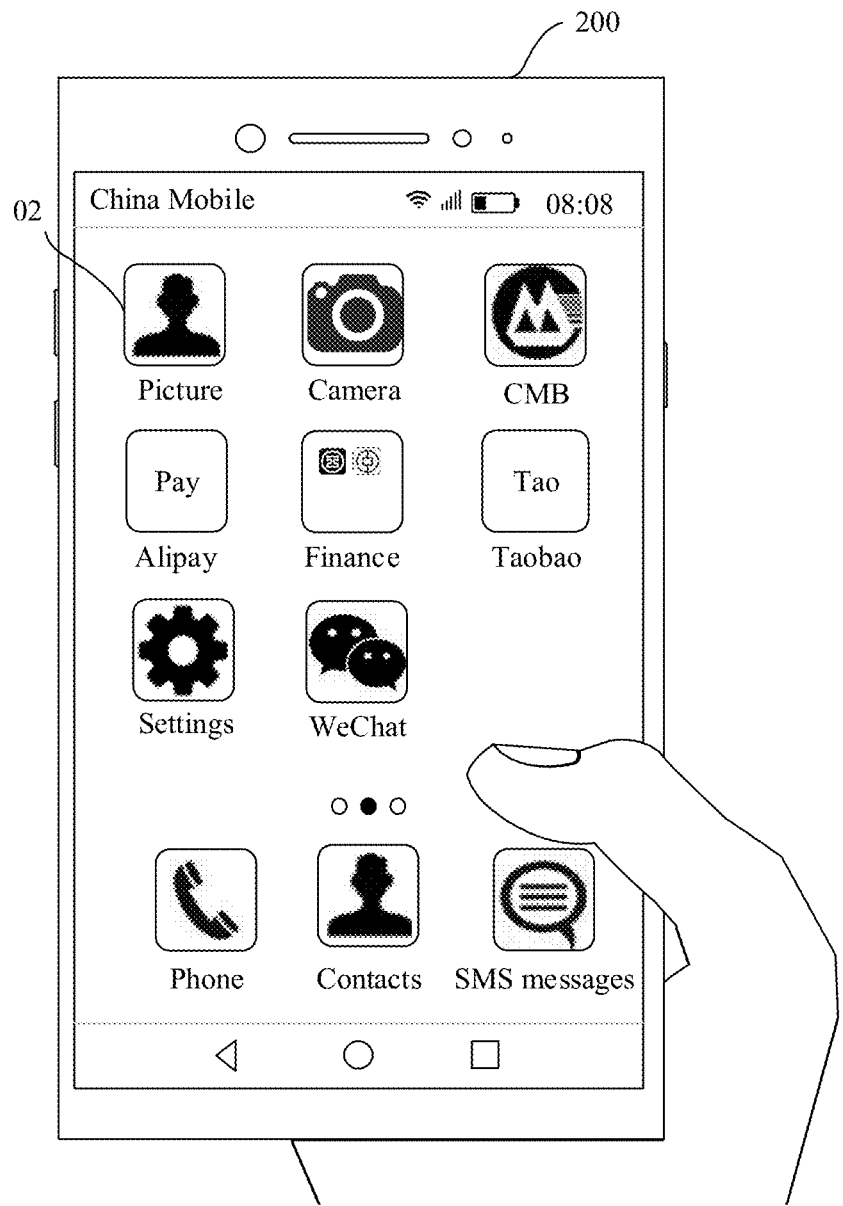
Figure 2:
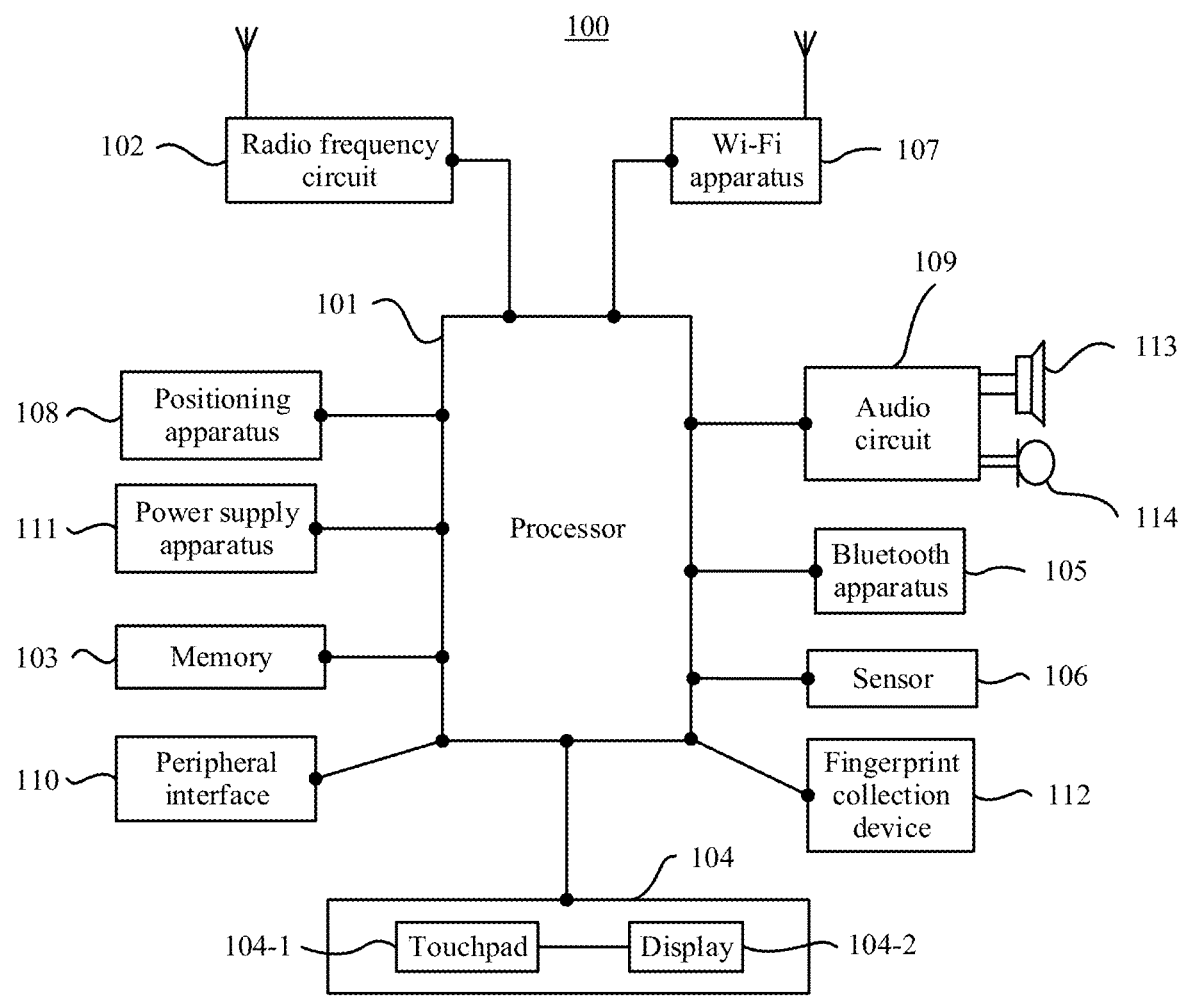
FIG. 2 is a schematic diagram of components of a mobile phone to which a touch display screen operation method in this application can be applied.

For ease of understanding, the following describes what user equipment is like by using an example. FIG. 2 shows components included in a mobile phone 100.

As shown in FIG. 2, the mobile phone 100 may include components such as a processor 101, a radio frequency (RF) circuit 102, a memory 103, a touch display screen 104, a Bluetooth apparatus 105, one or more sensors 106, a wireless fidelity (Wi-Fi) apparatus 107, a positioning apparatus 108, an audio circuit 109, a peripheral interface 110, and a power supply apparatus 111. These components may communicate with each other by using one or more communications buses or signal cables (not shown in FIG. 2). A person skilled in the art can understand that the hardware structure shown in FIG. 2 does not constitute a limitation on the mobile phone, and the mobile phone 100 may include more or fewer components than those shown in the figure, or some components may be combined, or there may be a different component layout.

The following describes the components of the mobile phone 100 in detail with reference to FIG. 2.

The processor 101 is a control center of the mobile phone 100, connects various parts of the mobile phone 100 by using various interfaces and lines, and performs various functions and data processing of the mobile phone 100 by running or executing an application program stored in the memory 103 and invoking data stored in the memory 103. In some embodiments, the processor 101 may include one or more chips. For example, the processor 101 may include a Kirin 960 chip manufactured by Huawei Technologies Co., Ltd. In some embodiments of this application, the processor 101 may further include a fingerprint verification chip, configured to verify a collected fingerprint.

The radio frequency circuit 102 may be configured to send and receive a radio signal in an information sending/receiving process or a call process. Particularly, the radio frequency circuit 102 may receive downlink data of a base station and send the downlink data to the processor 101 for processing; and in addition, send uplink data to the base station. Usually, the radio frequency circuit includes but is not limited to an antenna, one or more amplifiers, a transceiver, a coupler, a low noise amplifier, a duplexer, and the like. In addition, the radio frequency circuit 102 may further communicate with another device through wireless communication. The wireless communication may conform to any communication standard or protocol, including but not limited to a global system for mobile communications protocol, a general packet radio service protocol, a code division multiple access protocol, a broadband code division multiple access protocol, a long term evolution protocol, an email protocol, a short message service protocol, or the like.

The memory 103 is configured to store the application program and the data. The processor 101 performs various functions and data processing of the mobile phone 100 by running the application program and the data that are stored in the memory 103. The memory 103 mainly includes a program storage region and a data storage region. The program storage region may store an operating system, or an application program required for one or more functions (for example, an audio play function or an image play function) of the mobile phone 100. The data storage region may store data (for example, audio data and a phone book) created when the mobile phone 100 is used. In addition, the memory 103 may include a high-speed random access memory (RAM), or may include a nonvolatile memory such as a magnetic disk storage device or a flash storage device, or another volatile solid-state storage device, or the like. The memory 103 may store various operating systems, for example, an iOS® operating system developed by Apple and an Android® operating system developed by Google. The memory 103 may be standalone, and is connected to the processor 101 by using the communications bus; or the memory 103 may be integrated with the processor 101.

The touch display screen 104 may include a touchpad 104-1 and a display 104-2.

The touchpad 104-1 may collect a touch operation of a user of the mobile phone 100, and send collected touch information to another component (for example, the processor 101). The touch operation performed by the user on the touchpad 104-1 may be a contact touch or a non- contact touch. The non-contact touch means that the user does not need to directly touch the touchpad to select, move, or drag a target (for example, an icon), but may perform an operation action at a location with a specific distance from the touchpad, so that the mobile phone 100 can perform a desired function. In addition, the touchpad 104-1 may be implemented in a plurality of types, for example, a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form such as a liquid crystal display or an organic light emitting diode. The touchpad 104-1 may cover the display 104-2. When detecting a touch event on or near the touchpad 104-1, the touchpad 104-1 transfers the touch event to the processor 101 to determine a type of the touch event. Then the processor 101 may provide corresponding visual output on the display 104-2 based on the type of the touch event. In FIG. 2, the touchpad 104-1 and the display screen 104-2 act as two independent components to implement input and output functions of the mobile phone 100 respectively. However, in some embodiments, the touchpad 104-1 and the display screen 104-2 may be integrated to implement the input and output functions of the mobile phone 100. It can be understood that the touch display screen 104 is formed by stacking a plurality of layers of materials, and only the touchpad (layer) and the display screen (layer) are shown in this embodiment of this application, but other layers are not described in this embodiment of this application. In addition, the touchpad 104-1 may be configured on a front surface of the mobile phone 100 in a form of a full panel, and the display screen 104-2 may also be configured on the front surface of the mobile phone 100 in a form of a full panel. This can form a bezel-less structure on the front surface of the mobile phone.

In addition, the mobile phone 100 may further have a fingerprint recognition function. For example, a fingerprint reader 112 may be configured on a rear surface of the mobile phone 100 (for example, below a rear camera), or a fingerprint reader 112 may be configured on the front surface of the mobile phone 100 (for example, below the touch display screen 104). For another example, a fingerprint collection device 112 may be configured in the touch display screen 104 to implement the fingerprint recognition function. To be specific, the fingerprint collection device 112 may be integrated with the touch display screen 104 to implement the fingerprint recognition function of the mobile phone 100. In this case, the fingerprint collection device 112 is configured in the touch display screen 104, and may be a part of the touch display screen 104, or may be configured in the touch display screen 104 in another manner. In this embodiment of this application, a main component of the fingerprint collection device 112 is a fingerprint sensor. Any type of sensing technology may be used for the fingerprint sensor, including but not limited to an optical sensing technology, a capacitive sensing technology, a piezoelectric sensing technology, an ultrasonic sensing technology, or the like.

The mobile phone 100 may further include the Bluetooth apparatus 105, configured to exchange data between the mobile phone 100 and another short-range device (for example, a mobile phone or a smartwatch). In this embodiment of this application, the Bluetooth apparatus may be an integrated circuit, a Bluetooth chip, or the like.

The mobile phone 100 may further include at least one type of sensor 106, for example, an optical sensor, a motion sensor, and another sensor. The optical sensor may include an ambient light sensor and a proximity sensor. The ambient light sensor may adjust brightness of the display of the touch display screen 104 based on intensity of ambient light. When the mobile phone 100 moves to an ear, the proximity sensor may turn off a power supply of the display. As a motion sensor, an accelerometer sensor may detect for a value of an acceleration in various directions (there are usually three axes), may detect for a value and a direction of gravity when the mobile phone is still, and may be applied to an application (for example, landscape/portrait mode switching, a related game, or magnetometer posture calibration) for recognizing a posture of the mobile phone, a function (for example, a pedometer or a keystroke) related to vibration recognition, and the like. For another sensor that may be further configured on the mobile phone 100, for example, a gyroscope, a barometer, a hygrometer, a thermometer, or an infrared sensor, details are not described herein.

The Wi-Fi apparatus 107 is configured to provide the mobile phone 100 with network access conforming to a Wi-Fi related standard protocol. The mobile phone 100 may access a Wi-Fi access point by using the Wi-Fi apparatus 107, to help the user send and receive an email, browse a web page, access streaming media, and the like. The Wi-Fi apparatus 107 provides wireless broadband Internet access for the user. In some other embodiments, the Wi-Fi apparatus 107 may also be used as a Wi-Fi wireless access point, to provide Wi-Fi network access for another device.

The positioning apparatus 108 is configured to provide a geographical location for the mobile phone 100. It can be understood that the positioning apparatus 108 may be a receiver of a positioning system such as a global positioning system (GPS), a Beidou satellite navigation system, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may be alternatively a receiver of an assisted global positioning system (AGPS). The AGPS system serves as an assisted server to assist the positioning apparatus 108 in completing ranging and positioning services. In this case, the assisted positioning server communicates with a device, such as the positioning apparatus 108 (namely, the GPS receiver) of the mobile phone 100, through a wireless communications network, to provide positioning assistance. In some other embodiments, the positioning apparatus 108 may be alternatively a positioning technology based on a Wi-Fi access point. Each Wi-Fi access point has a globally unique media access control (MAC) address. Therefore, when Wi-Fi is enabled for a device, the device may scan and collect a broadcast signal of a nearby Wi-Fi access point, and therefore may obtain a MAC address broadcast by the Wi-Fi access point. The device sends, to a location server through a wireless communications network, data (for example, the MAC address) that can identify the Wi-Fi access point. The location server retrieves a geographical location of each Wi-Fi access point, calculates a geographical location of the device with reference to strength of a Wi-Fi broadcast signal, and sends the geographical location to the positioning apparatus 108 of the device.

The audio circuit 109, a speaker 113, and a microphone 114 may provide an audio interface between the user and the mobile phone 100. The audio circuit 109 may transmit, to the speaker 113, an electrical signal that is converted from received audio data. The speaker 113 converts the electrical signal into an acoustical signal and outputs the acoustical signal. In another aspect, the microphone 114 converts a collected acoustical signal into an electrical signal. The audio circuit 109 receives the electrical signal, converts the electrical signal into audio data, and outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the mobile phone 100 is connected to the mouse through a universal serial bus (USB) interface, and is connected, by using a metal contact on a card slot of the subscriber identification module card, to the subscriber identification module (SIM) card provided by a telecommunications operator. The peripheral interface 110 may be configured to couple the external input/output peripheral device to the processor 101 and the memory 103.

In this embodiment of this application, the mobile phone 100 may communicate with another device in a device group through the peripheral interface 110. For example, the mobile phone 100 may receive, through the peripheral interface 110, display data sent by the another device for display. This is not limited in this embodiment of this application.

The mobile phone 100 may further include the power supply apparatus 111 (for example, a battery and a power management chip) that supplies power to each component. The battery may be logically connected to the processor 101 by using the power management chip, to implement functions such as charging management, discharging management, and power consumption management by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein.

In this application, a shortcut touchpad is disposed, a sliding track of a user is detected on the shortcut touchpad to identify a sliding direction of the sliding track, the sliding direction is mapped to an interaction interface of user equipment, and it is predicted, by using a first input region as a reference point and based on the sliding direction of the sliding track entered by the user, that the user expects to select an input region from a region along the direction. Therefore, a second input region is selected in the region along the direction, and the selected second input region is enabled to enter a selected state. The user does not need to enter a long sliding track, provided that the user equipment can identify a sliding direction. Because there is no requirement on a length of the sliding track, the user may perform an operation on the shortcut touchpad with a thumb, so that the user can operate the user equipment with one hand, improving user experience.

The sliding operation of the user on the shortcut touchpad is matched to the interaction interface of the user equipment, so that switching can be freely performed between a plurality of input regions of the interaction interface. In this way, no direct operation is required on the interaction interface, and the interaction interface may be made to be larger, to achieve visual enjoyment for the user.

The shortcut touchpad is disposed so that the user equipment has two working modes. One is operating the interaction interface by applying a touch instruction on the shortcut touchpad, and the other is operating the interaction interface by applying a touch instruction on the interaction interface. In addition, the user may select either of the two working modes for free switching, to meet the user's usage requirements in different scenarios.

The following describes the embodiments of this application one by one.

Figure 3:
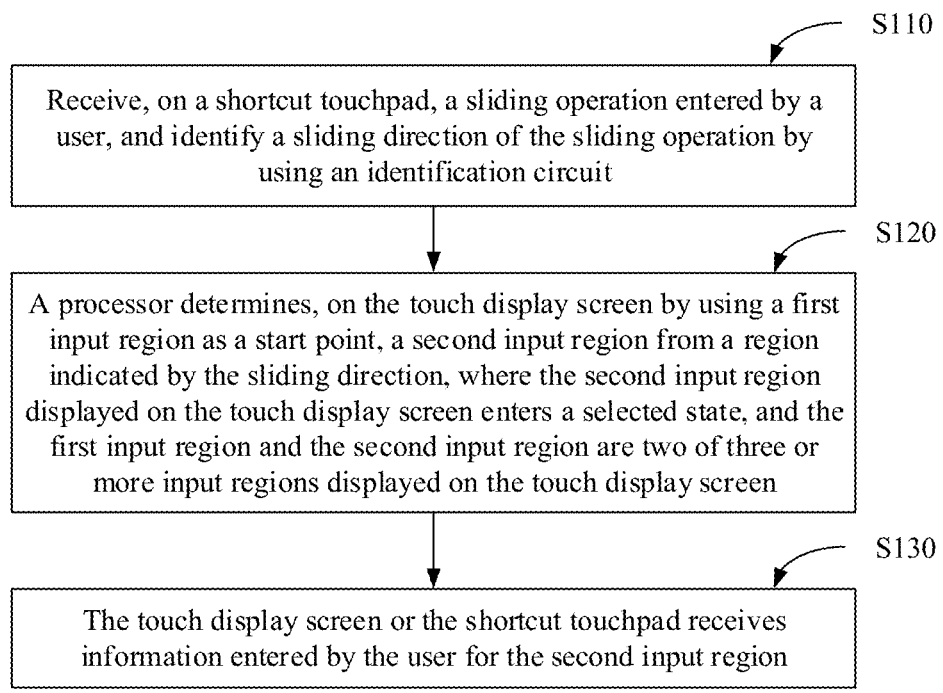
FIG. 3 is a flowchart of an embodiment of a first touch display screen operation method according to this application.

As shown in FIG. 3, this application provides a first touch display screen operation method. The method includes the following operations.

S110. Receive, on a shortcut touchpad, a sliding operation entered by a user, and identify a sliding direction of the sliding operation by using an identification circuit.

S120. A processor determines, on the touch display screen by using a first input region as a start point, a second input region from a region indicated by the sliding direction, where the second input region displayed on the touch display screen enters a selected state, and the first input region and the second input region are two of three or more input regions displayed on the touch display screen.

S130. The touch display screen or the shortcut touchpad receives information entered by the user for the second input region.

In the foregoing embodiment, the input region is a region that is displayed on an interaction interface of the touch display screen and in which the user can enter various types of touch operation information. The touch operation information may include text information, tap operation information, drag operation information, sliding operation information, or the like. The touch operation information may be contact touch operation information, or may be non-contact touch operation information. The contact touch operation information may be contact information of a contact or information about pressure applied by a contact, and the contact may be a finger of the user, a rubber nib, or another tool. The non-contact touch operation information is information about an operation applied at a location with a specific distance from the touch display screen.

The input region is a window for information exchange between the user and user equipment. A plurality of input regions are distributed on the interaction interface of the touch display screen. The first input region and the second input region are two different input regions in the plurality of input regions. Generally, a pattern displayed on a background (or referred to as a desktop wallpaper) of the interaction interface cannot be tapped or dragged by the user. Therefore, the background is usually not an input region, but various application icons or the like presented based on the background may be input regions. The input region needs to be displayed on the interaction interface. An icon or the like that is not displayed cannot be operated by the user, and therefore is not an input region. Some user equipment have a plurality of interaction interfaces, for example, a home screen and a Google feed. However, only one of the interaction interfaces can be displayed on a touch display screen, and a user can enter information only on the displayed interaction interface. Therefore, the input region is located on the displayed interaction interface.

Figure 4A:
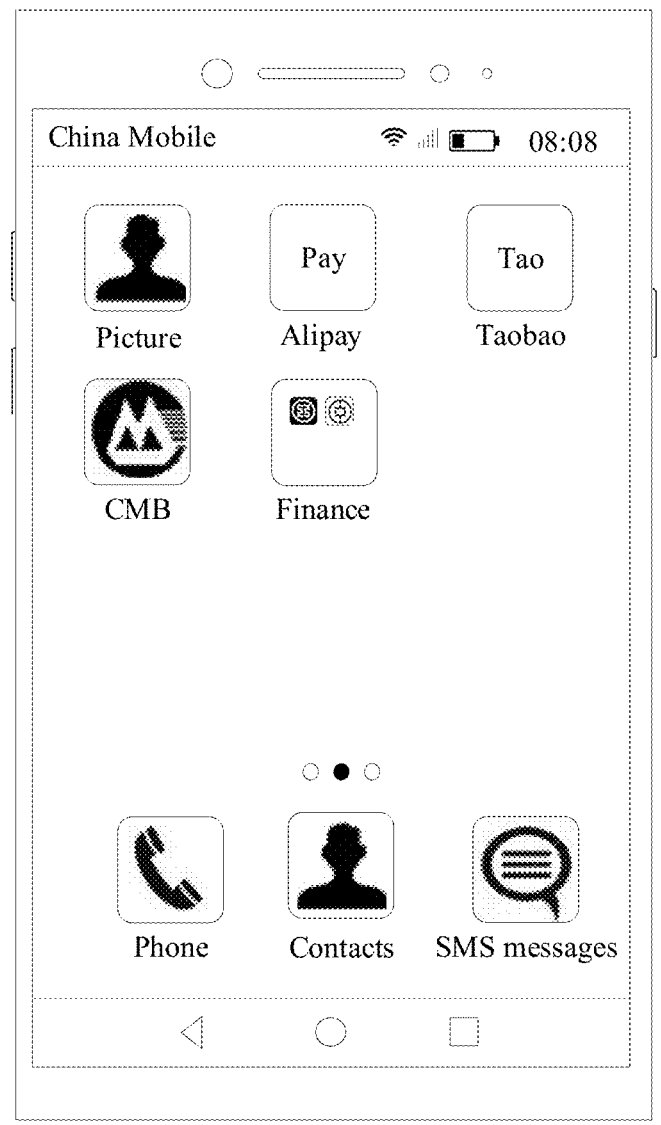
FIG. 4(a) is a schematic diagram of an input region being an application icon according to an embodiment of a first touch display screen operation method in this application.

As shown in FIG. 4(a), the input region may be an application icon on a desktop wallpaper. The user may enter tap operation information on the application icon. The user equipment may learn, based on the tap operation information of the user, that the user expects to start an application indicated by the application icon.

Figure 4B:
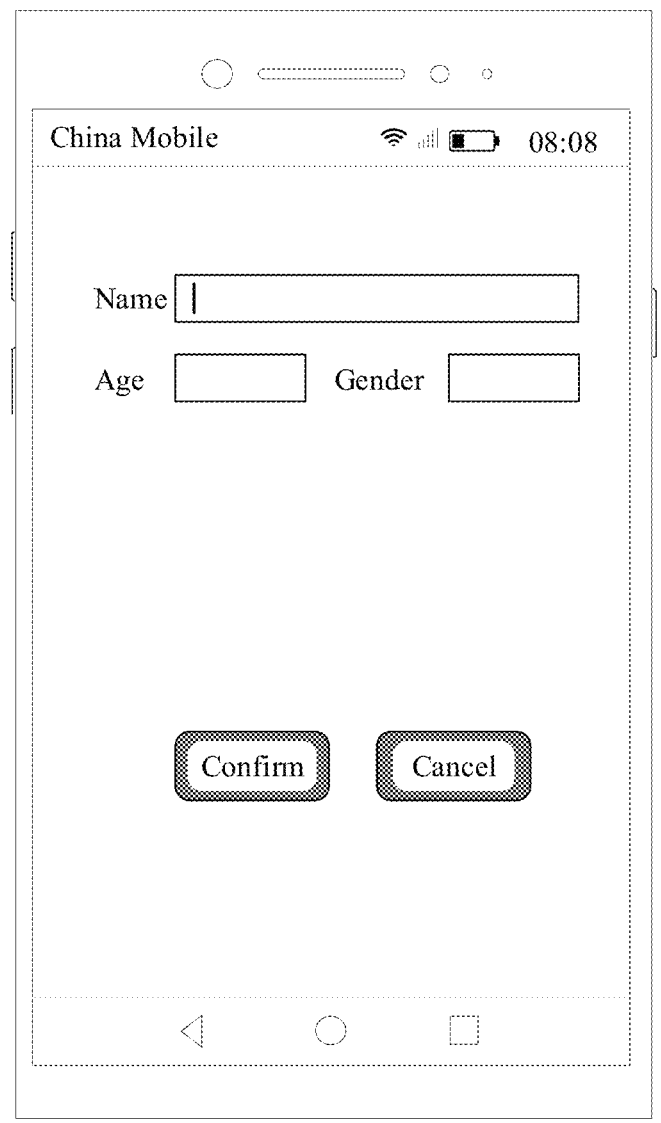
FIG. 4(b) is a schematic diagram of an input region being a dialog box according to an embodiment of a first touch display screen operation method in this application.

As shown in FIG. 4(b), the input region may be an input dialog box displayed on the interaction interface of the touch display screen, and the user may enter text information in the dialog box. When the input region is in a selected state, the text information may also be entered on the shortcut touchpad.

The input region may be alternatively an input key, and the user may touch the input key, so that the user equipment learns that the input key is selected. The input key may be each key on a virtual keyboard, or may be an "OK" virtual button.

The input region may be alternatively a drop-down notification bar, and the user may touch any option in the notification bar, so that the user equipment learns that the option is selected. When the input region is in a selected state, a "touch" operation of touching any option in the notification bar may be performed on the shortcut touchpad.

The input region may be various graphic elements displayed on the interaction interface of the touch display screen, and the graphic element may be tapped, touched, dragged, or the like by the user.

In an embodiment of the first touch display screen operation method provided in this application, the identification circuit may be integrated with the processor, or the identification circuit is integrated with the shortcut touchpad.

In an embodiment of the first touch display screen operation method provided in this application, in operation S120, that the second input region displayed on the touch display screen enters a selected state may include:

enabling, by the touch display screen according to an instruction of the processor, the second input region to enter the selected state.

When the input region is in the selected state, the user may enter various types of touch operation information in the input region. From another perspective, the user equipment may receive various types of touch operation information in the input region. In addition, the user may enter the information by using the shortcut touchpad.

When the input region is in a non-selected state, the input region cannot receive any input information.

A region occupied by the input region on the touch display screen may be a rectangular region or a region of another regular shape. Regions occupied by input regions of a same type may have a same shape or similar shapes, and may have an equal size.

A display element presented when the input region is in the selected state may be different from that presented when the input region is in the non-selected state. For example, when the input region is in the selected state, compared with that when the input region is in the non-selected state, a text or a pattern displayed in the input region changes, or a border of the input region changes. When the input region is in the selected state, a cursor may blink in the input region. When the input region is in the non-selected state, the cursor is located elsewhere or does not appear.

That a text or a pattern displayed in the input region changes may be that the displayed text or pattern is outlined, or the displayed text or pattern becomes larger, or the displayed text or pattern changes from a non-hover state to a hover state, or the like.

That a border of the input region changes may be that a color of the border changes, a line of the border becomes thicker, brightness of the line of the border increases, a background color within the border changes, or the like.

In the foregoing embodiment, the sliding direction of the sliding operation entered by the user can be received on the shortcut touchpad through detection on the shortcut touchpad. The shortcut touchpad may be a touchscreen, and the shortcut touchpad may learn of an instruction of the user by sensing contact information of a contact or information about pressure applied by a contact. The shortcut touchpad may alternatively integrate a function of a display, to display some information.

Figure 5A:
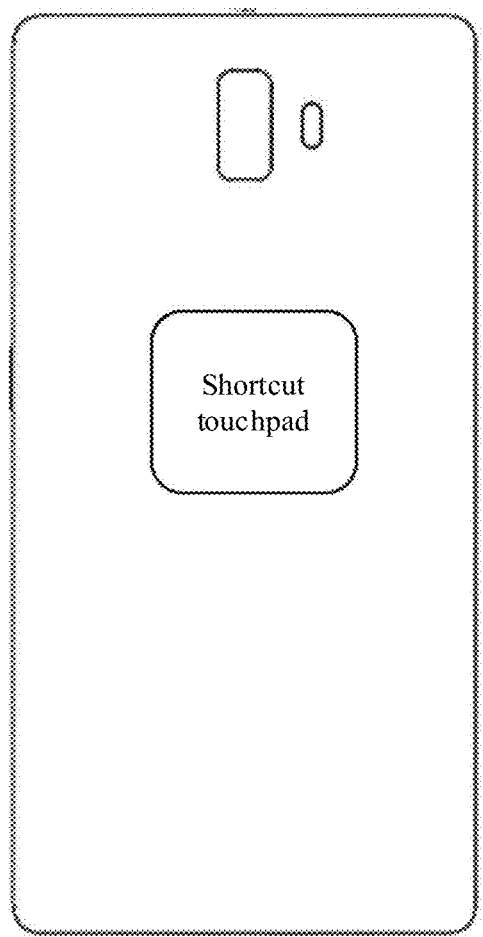
FIG. 5(a) is a schematic diagram of a shortcut touchpad being disposed on a rear surface of user equipment according to an embodiment of a first touch display screen operation method in this application.
Figure 5B:
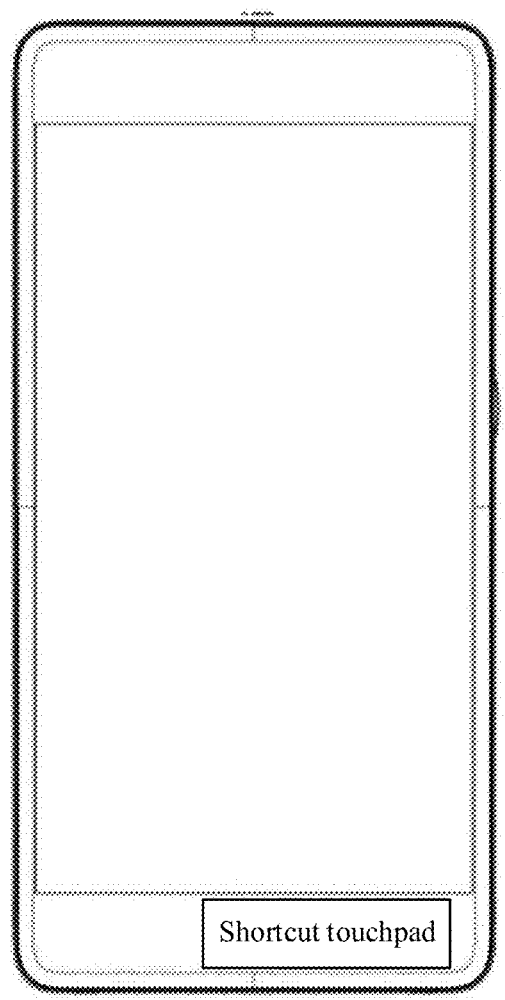
FIG. 5(b) is a schematic diagram of a shortcut touchpad being disposed at a lower bezel location on a front surface of user equipment according to an embodiment of a first touch display screen operation method in this application.
Figure 5C:
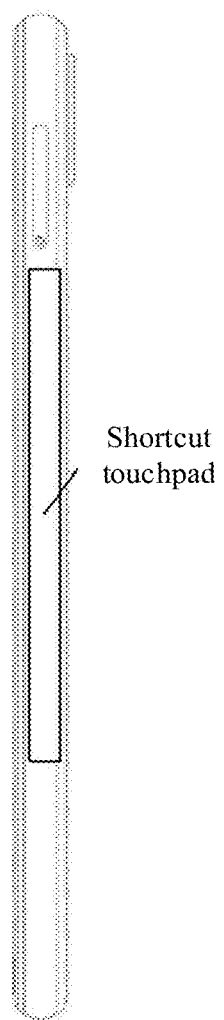
FIG. 5(c) is a schematic diagram of a shortcut touchpad being disposed at a side bezel location of user equipment according to an embodiment of a first touch display screen operation method in this application.

The touch display screen and the shortcut touchpad in the user equipment may be separately disposed. Usually, the touch display screen is disposed on a front surface of the user equipment, and the front surface is a surface, of the user equipment, facing the user when the user uses the user equipment. The shortcut touchpad may be disposed on the front surface, a rear surface, or a side surface of the user equipment. A mobile terminal is used as an example. As shown in FIG. 5(a), a shortcut touchpad may be disposed on a rear surface of the mobile terminal. As shown in FIG. 5(b), the shortcut touchpad may be alternatively disposed at a lower bezel location on a front surface of the mobile terminal, that is, a location outside a touch display screen. As shown in FIG. 5(c), the shortcut touchpad may be alternatively disposed at a side bezel location of the mobile terminal.

Figure 5D:
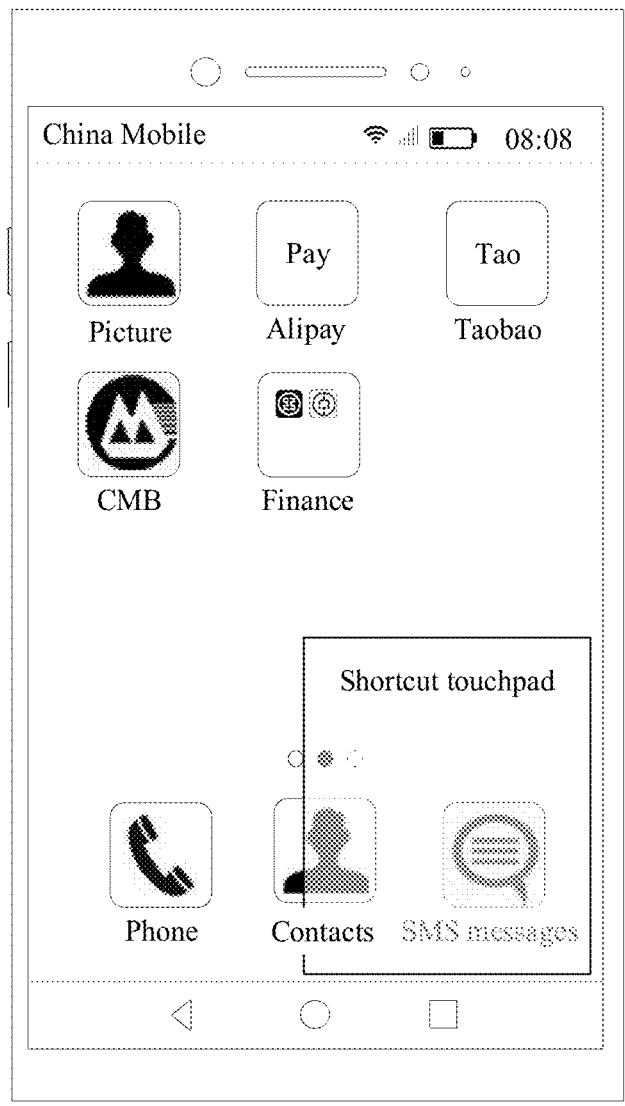
FIG. 5(d) is a schematic diagram of a shortcut touchpad being disposed in a part of a region on a touch display screen according to an embodiment of a first touch display screen operation method in this application.

The touch display screen may be alternatively integrated with the shortcut touchpad. The shortcut touchpad is located in a part of a region on the touch display screen. A mobile terminal is used as an example. As shown in FIG. 5(d), in a part of a region on a touch display screen on a front surface of the mobile terminal, generation of a "shortcut touchpad" is triggered in a preset manner.

In an embodiment of the first touch display screen operation method provided in this application, before operation S110, the method may further include the following operation:

S108. Activate a part of a region of the touch display screen as the shortcut touchpad based on a detected trigger signal.

A region activated as the shortcut touchpad may be located at an edge location of the touch display screen, for example, located at a corner location of the shortcut touchpad.

The trigger signal may be various signals that can be detected by a sensor of the user equipment, for example, a touch signal applied in the region activated as the shortcut touchpad, for example, a double-tap signal or a pressing signal.

In an embodiment of operation S108, the touch display screen may send the detected trigger signal to the processor, and the processor instructs the touch display screen to activate a part of a region as the shortcut touchpad; or the touch display screen may activate a part of a region as the shortcut touchpad based on the detected trigger signal.

In the embodiment of operation S108, the processor instructs, based on the detected trigger signal and a holding gesture of the user, the touch display screen to activate a region close to a palm of the user as the shortcut touchpad.

Using a mobile terminal as an example, the gesture of holding the user equipment by the user may be detected by a sensor disposed on a side bezel of the mobile terminal.

The region close to the palm of the user may be a region that can be reached by a thumb of the user.

Because sizes of palms of users are different, and lengths of fingers are also different, statistics may be collected based on length data of parts of hands of a plurality of users, to obtain data that can adapt to hands of most users, to obtain the region close to the palm of the user. The region that can be reached by the thumb of the user may also be obtained in a similar manner.

Using a mobile terminal as an example, when a user holds a lower part of the mobile terminal with a right hand, a region in a lower right part of the mobile terminal is designated as a region of the shortcut touchpad; or when a user holds a lower part of the mobile terminal with a left hand, a region in a lower left part of the mobile terminal is designated as a region of the shortcut touchpad.

In an embodiment of the first touch display screen operation method provided in this application, after operation S108 and before operation S110, the method may further include the following operation:

S109. A region in which the shortcut touchpad is located is different from another region on the touch display screen in display.

In operation S109, the first input region and the second input region are located in a region outside the shortcut touchpad. All input regions displayed on the touch display screen may be located in a region outside the shortcut touchpad. If some input regions are located in the region in which the shortcut touchpad is located, when the second input region is selected, the input regions located in the region in which the shortcut touchpad is located are beyond a selection range.

In an embodiment of operation S109, the touch display screen may present different display in the region in which the shortcut touchpad is located and another region; or the touch display screen may present, according to an instruction of the processor, different display in the region in which the shortcut touchpad is located and another region.

In operation S109, for the first input region in the input regions displayed on the touch display screen, the first input region may be at a location that is on the touch display screen and that is far away from the shortcut touchpad. For example, the first input region is located at a corner location farthest away from the shortcut touchpad.

A mobile terminal is used as an example. As shown in FIG. 6(a), when the mobile terminal is held vertically by a right hand, the first input region is presented in an upper left corner of the touch display screen. As shown in FIG. 6(b), when the mobile terminal is held vertically by a left hand, the first input region is presented in an upper right corner of the touch display screen. As shown in FIG. 6(c), when the mobile terminal is held horizontally by a right hand, the first input region is presented in an upper left corner of the touch display screen. As shown in FIG. 6(d), when the mobile terminal is held horizontally by a left hand, the first input region is presented in an upper right corner of the touch display screen.

In an embodiment of the first touch display screen operation method provided in this application, an area occupied by the shortcut touchpad on a surface of the user equipment is less than that occupied by the touch display screen on the surface of the user equipment. An intuitive feeling of the user is that the shortcut touchpad is smaller than the touch display screen. Because the shortcut touchpad is relatively small, the shortcut touchpad may be operated with one hand.

In an embodiment of the first touch display screen operation method provided in this application, in operation S120, the determining, by using a first input region as a start point, a second input region from a region indicated by the sliding direction includes:

determining a reference direction on the touch display screen based on the sliding direction, and determining the second input region from a region that uses the first input region as a start point and that is along the reference direction.

In an embodiment of the first touch display screen operation method provided in this application, a manner of determining the reference direction on the touch display screen based on the sliding direction in operation S120 includes the following several types:

first manner: identifying an included angle between the sliding direction and a horizontal coordinate axis of the shortcut touchpad, and determining the reference direction based on the included angle, where a magnitude of an included angle between the reference direction and a horizontal coordinate axis of the touch display screen is equal to a magnitude of the included angle between the sliding direction and the horizontal coordinate axis of the shortcut touchpad; or second manner: identifying an included angle between the sliding direction and a vertical coordinate axis of the shortcut touchpad, and determining the reference direction based on the included angle, where a magnitude of an included angle between the reference direction and a vertical coordinate axis of the touch display screen is equal to a magnitude of the included angle between the sliding direction and the vertical coordinate axis of the shortcut touchpad.

It should be noted that the reference direction may be displayed on the touch display screen. The sliding direction may also be displayed on the shortcut touchpad.

The included angle between the sliding direction and the horizontal coordinate axis or the vertical coordinate axis of the shortcut touchpad may be identified by using the following embodiment:

As shown in FIG. 7(b), it is assumed that an upper left corner of the shortcut touchpad is an origin o of coordinates, a horizontally leftward axis is an x-axis, and a vertically downward axis is a y-axis. It is detected that a start touch point of the user is t1 $(x1, y1)$, and an end touch point of a sliding touch is t2 $(x2, y2)$. The coordinates of t1 are compared with those of t2, and a sliding direction may be calculated by using the coordinates. For example:

when $x1<x2$ and $y1<y2$, the sliding direction is "downward to the right", and an included angle between a direction of downward sliding to the right and the x-axis is: $□θ=\arctan((y2-y1)/(x2-x1))$;

when $x1<x2$ and $y1>y2$, the sliding direction is "upward to the right", and an included angle between a direction of upward sliding to the right and the x-axis is: $□θ=\arctan((y2-y1)/(x2-x1))$;

when $x1>x2$ and $y1>y2$, the sliding direction is "upward to the left", and an included angle between a direction of upward sliding to the left and the x-axis is: $□θ=\arctan((y2-y1)/(x2-x1))$;

when $x1>x2$ and $y1<y2$, the sliding direction is "downward to the left", and an included angle between a direction of downward sliding to the left and the x-axis is: $□θ=\arctan((y2-y1)/(x2-x1))$;

when $x1=x2$ and $y1<y2$, the sliding direction is "vertically downward";

when $x1=x2$ and $y1>y2$, the sliding direction is "vertically upward";

when $x1<x2$ and $y1=y2$, the sliding direction is "horizontally rightward"; or when $x1>x2$ and $y1=y2$, the sliding direction is "horizontally leftward".

When the shortcut touchpad is located on the front surface or the rear surface of the user equipment, the horizontal coordinate axis of the shortcut touchpad and the horizontal coordinate axis of the touch display screen are parallel and in a same direction, the vertical coordinate axis of the shortcut touchpad and the vertical coordinate axis of the touch display screen are parallel and in a same direction, and the reference direction and the sliding direction are parallel and in a same direction.

Although the sliding direction is mapped onto the touch display screen, because the sliding direction and the reference direction are parallel and in a same direction, the user feels like that the sliding operation is directly performed on the touch display screen, and easily masters an operation skill.

When the shortcut touchpad is located on the left-side bezel of the user equipment (FIG. 5(c) shows that the shortcut touchpad is located on the right-side bezel, and the left-side bezel of the user equipment is a side surface opposite to the right-side bezel), there are the following two embodiments:

First manner: The vertical coordinate axis of the shortcut touchpad and the vertical coordinate axis of the touch display screen are parallel and in a same direction, the horizontal coordinate axis of the shortcut touchpad extends from a rear part of the user equipment to a front part of the user equipment, and the horizontal coordinate axis of the touch display screen extends from a left side of the user equipment to a right side of the user equipment.

Second manner: The vertical coordinate axis of the shortcut touchpad and the vertical coordinate axis of the touch display screen are parallel and in a same direction, the horizontal coordinate axis of the shortcut touchpad extends from a front part of the user equipment to a rear part of the user equipment, and the horizontal coordinate axis of the touch display screen extends from a right side of the user equipment to a left side of the user equipment.

It should be noted that when the user equipment is used, a part facing the user is the front part, and a part away from the user is the rear part.

When the shortcut touchpad is located on the right-side bezel of the user equipment (as shown in FIG. 5(c)), there are the following two embodiments:

First manner: The vertical coordinate axis of the shortcut touchpad and the vertical coordinate axis of the touch display screen are parallel and in a same direction, the horizontal coordinate axis of the shortcut touchpad extends from a rear part of the user equipment to a front part of the user equipment, and the horizontal coordinate axis of the touch display screen extends from a right side of the user equipment to a left side of the user equipment.

Second manner: The vertical coordinate axis of the shortcut touchpad and the vertical coordinate axis of the touch display screen are parallel and in a same direction, the horizontal coordinate axis of the shortcut touchpad extends from a front part of the user equipment to a rear part of the user equipment, and the horizontal coordinate axis of the touch display screen extends from a left side of the user equipment to a right side of the user equipment.

Because the user performs the sliding operation on the shortcut touchpad, and the user equipment responds on the touch display screen, the user is likely to have some illusions and feel unconformable. When the shortcut touchpad is located on a side bezel, the horizontal coordinate axis and the vertical coordinate axis are set in the foregoing manners, so that discomfort of the user can be relieved to some extent.

A shape of the shortcut touchpad may be similar to that of the interaction interface of the touch display screen. For example, both the shortcut touchpad and the interaction interface are rectangular. A length obtained by amplifying a length of each side of the shortcut touchpad by an equal multiple is equal to a length of each corresponding side of the interaction interface.

In an embodiment of the first touch display screen operation method provided in this application, the input regions displayed on the touch display screen may be adjacently arranged, or may be dispersedly arranged.

Because the first input region is a region, the using the first input region as a start point may be using any point in the first input region as a start point.

The start point may be any vertex in the first input region, or may be a center point (for example, an intersection point of two or more diagonals) in the first input region.

If the first input region is rectangular, the start point may be any one of four vertices of the first input region, or the start point may be a point at which two diagonals of the rectangle intersect.

In an embodiment of the first touch display screen operation method provided in this application, when the second input region is selected by using the first input region as the start point, the first input region is in a selected state, and the method further includes:

when or before the second input region is enabled to enter a selected state, enabling the first input region to enter a non-selected state.

In another embodiment, when the second input region is selected by using the first input region as the start point, the first input region is not in a selected state, and the first input region is an input region located at a corner location or a center location on the touch display screen.

In an embodiment of the first touch display screen operation method provided in this application, rays on the touch display screen whose endpoints are located at the start point, that are located on two sides of the reference direction, and that have an included angle of x degrees with the reference direction are first rays; rays whose endpoints are located at the start point, that are located on the two sides of the reference direction, and that have an included angle of y degrees with the reference direction are second rays; a region, on the touch display screen, between a first ray located on a left side of the reference direction and a first ray located on a right side of the reference direction is a first region; a region, on the touch display screen, between a first ray located on a left side of the reference direction and a second ray located on the left side of the reference direction is a second region; and a region, on the touch display screen, between a first ray located on a right side of the reference direction and a second ray located on the right side of the reference direction is also a second region, where 0<x<45, 0 21 y<45, and x<y.

In operation S120, the determining the second input region from a region that uses the first input region as a start point and that is along the reference direction is processed in the following two embodiments:

First manner: When there is only one input region in the first region, the input region is used as the second input region; or when there are two or more input regions in the first region, an input region having a smallest included angle with the reference direction is selected, as the second input region, from the input regions in the first region, where the included angle between the input region and the reference direction is an included angle between the reference direction and a connection line from the start point to the input region; or when there are two or more input regions having a smallest included angle with the reference direction, an input region closest to the start point is selected, as the second input region, from the two or more input regions having a smallest included angle with the reference direction.

Second manner: When there is only one input region in the second region, the input region is used as the second input region; or or when there are two or more input regions in the second region, an input region closest to the start point is selected, as the second input region, from the input regions in the second region; or when there are two or more input regions closest to the start point, an input region having a smallest included angle with the reference direction is selected, as the second input region, from the two or more input regions closest to the start point.

A distance between the input region and the start point is a distance from the start point to a connection point in the input region.

The connection line between the start point and the input region may be a connection line between the start point and the connection point in the input region. The connection point may be any point in the input region, and may be a vertex or a center point (for example, an intersection point of two or more diagonals) of the input region.

In the foregoing two manners of selecting the second input region, when both the first region and the second region include input regions, the first manner may be preferentially used to select the second input region, or the second manner may be preferentially used to select the second input region.

For ease of an operation, regions occupied on the touch display screen by the first input region and another input region may have a same shape or similar shapes. In addition, a location of the start point in the first input region is the same as or similar to a location of the connection point in another input region. For example, the start point is located at an upper left vertex of the first input region, and the connection point is also located at an upper left vertex of the another input region; the start point is located at an upper right vertex of the first input region, and the connection point is also located at an upper right vertex of the another input region; the start point is located at a lower left vertex of the first input region, and the connection point is also located at a lower left vertex of the another input region; the start point is located at a lower right vertex of the first input region, and the connection point is also located at a lower right vertex of the another input region; or the start point is located at a center point of the first input region, and the connection point is also located at a center point of the another input region.

For brevity of the solution, if the connection point of the input region is located in the first region, it is considered that the input region is located in the first region; or if the connection point of the input region is located in the second region, it is considered that the input region is located in the second region.

For ease of understanding, the following describe a process of selecting the second input region by using a specific example.

As shown in FIG. 7(a), it is assumed that the start point is a point O, a direction indicated by an arrow OT is the reference direction, and the first input region is an input region in which the point O is located. In the figure, in addition to the first input region, there are further a plurality of input regions, and connection points in the input regions are a point A, a point B, a point C, a point D, a point F, a point G, and the like. Included angles, such as ∠AOT, ∠BOT, ∠COT, ∠DOT, ∠FOT, and ∠GOT, may be calculated based on coordinates of the points. Apparently, these included angles are within a range of 0-180 degrees.

Figure 8:
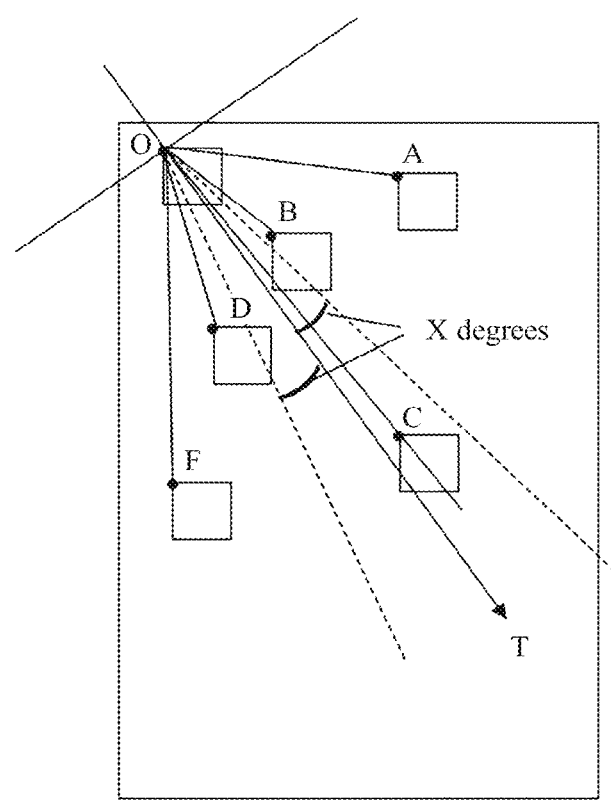
FIG. 8 is a schematic diagram of an included angle between each input region and a reference direction on the touch display screen in a first input region layout manner according to an embodiment of a first touch display screen operation method in this application.

A magnitude of each included angle is compared with X degrees, and an input region whose included angle is less than X degrees is determined as a candidate input region. For example, X is 15. As shown in FIG. 8, by comparing the included angles ∠AOT, ∠BOT, ∠COT, ∠DOT, and ∠FOT with 15 degrees, it is determined that an input region whose included angle is less than 15 degrees is an input region in which the point C is located. In this case, the input region in which the point C is located is selected as the second input region.

Figure 9:
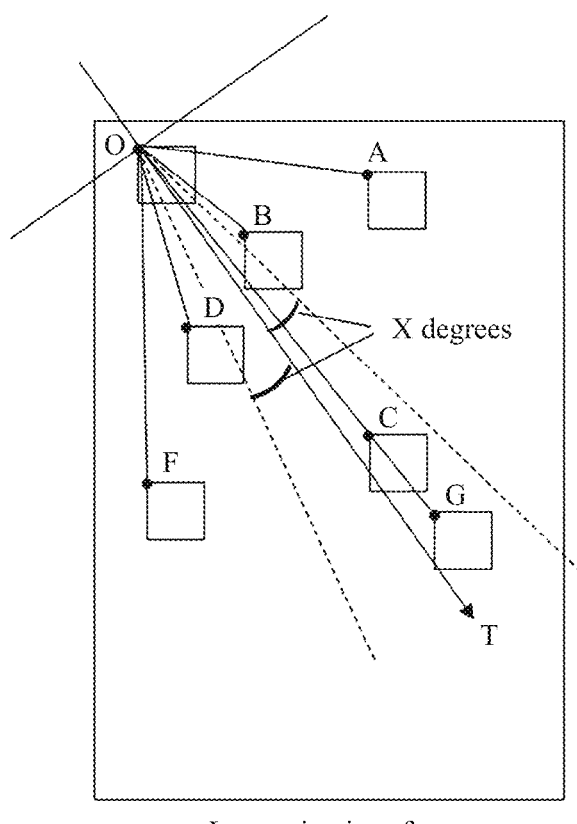
FIG. 9 is a schematic diagram of an included angle between each input region and a reference direction on the touch display screen in a second input region layout manner according to an embodiment of a first touch display screen operation method in this application.

In another case, as shown in FIG. 9, by comparing the included angles ∠AOT, ∠BOT, ∠COT, ∠DOT, ∠FOT, and ∠GOT with X degrees, it is determined that input regions whose included angles are less than X degrees are an input region in which the point C is located and an input region in which the point G is located. In this case, an input region closer to the start point O is selected, as the second input region, from the input region in which the point C is located and the input region in which the point G is located.

A distance between the input region and the start point O is a distance between a connection point in the input region and the start point, and may be calculated based on coordinates of the connection point and coordinates of the start point.

For example, if coordinates of the point C are C (Xc, Yc) and coordinates of the point O are O (Xo, Yo), a distance between the point C and the point O is: $OC=\sqrt{(Xc-Xo)^2+(Yc-Yo)^2}$.

The distance between the input region and the start point may be calculated simultaneously when operation S120 is performed, or may be calculated before operation S120 is performed.

As shown in FIG. 9, by comparing the distance OC between the point C and the point O with a distance OG between the point G and the point O, it is determined that OC is smaller, so that the input region in which the point C is located is determined as the second input region.

Figure 10:
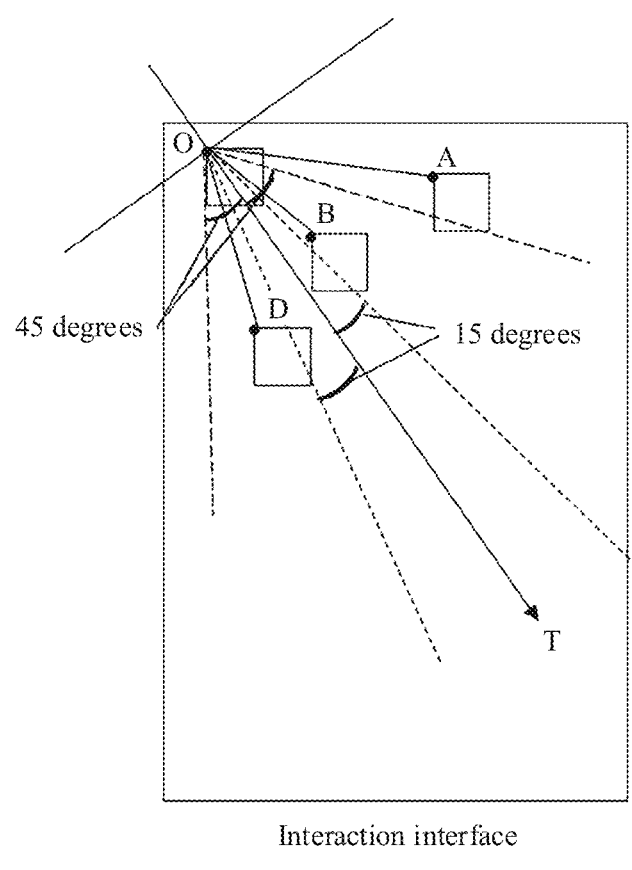
FIG. 10 is a schematic diagram of an included angle between each input region and a reference direction on the touch display screen in a third input region layout manner according to an embodiment of a first touch display screen operation method in this application.

As shown in FIG. 10, when there is no input region whose included angle is less than 15 degrees, the included angle between the input region and the reference direction is further compared with 45 degrees, and an input region whose included angle is less than 45 degrees is determined as a candidate input region.

By comparing the included angles ∠AOT, ∠BOT, and ∠DOT with 15 degrees, it is determined that there is no input region whose included angle is less than 15 degrees, and further, the included angles ∠AOT, ∠BOT, and ∠DOT are compared with 45 degrees. If there is only one input region whose included angle ranges from 15 degrees to 45 degrees, the input region is used as the second input region.

If there are two or more input regions whose included angles range from 15 degrees to 45 degrees, as shown in FIG. 10, it is determined that input regions whose included angles are greater than 15 degrees and less than 45 degrees are an input region in which the point B is located and an input region in which the point D is located. In this case, a distance OB between the point B and the point O is further compared with a distance OD between the point D and the point O, and it is determined that OB is smaller, so that the input region in which the point B is located is determined as the second input region.

In an embodiment of the first touch display screen operation method provided in this application, in operation S130, the information entered by the user for the second input region may be entered by using the second input region on the touch display screen, or may be entered by using the shortcut touchpad.

The information entered by the user may be various types of touch operation information, for example, text information, tap operation information, double-tap operation information, drag operation information, pressing information, or sliding information.

The user may enter a tap operation in the second input region, to start an application indicated by an application icon in the second input region. Alternatively, the user may enter a double-tap operation in the second input region, to select an option indicated by a key in the second input region.

After operation S130, the user may perform a next round of interaction with the user equipment on a current interaction interface. Alternatively, the user equipment opens another interaction interface, and the user starts to interact with the user equipment on the new interaction interface.

Figure 11:
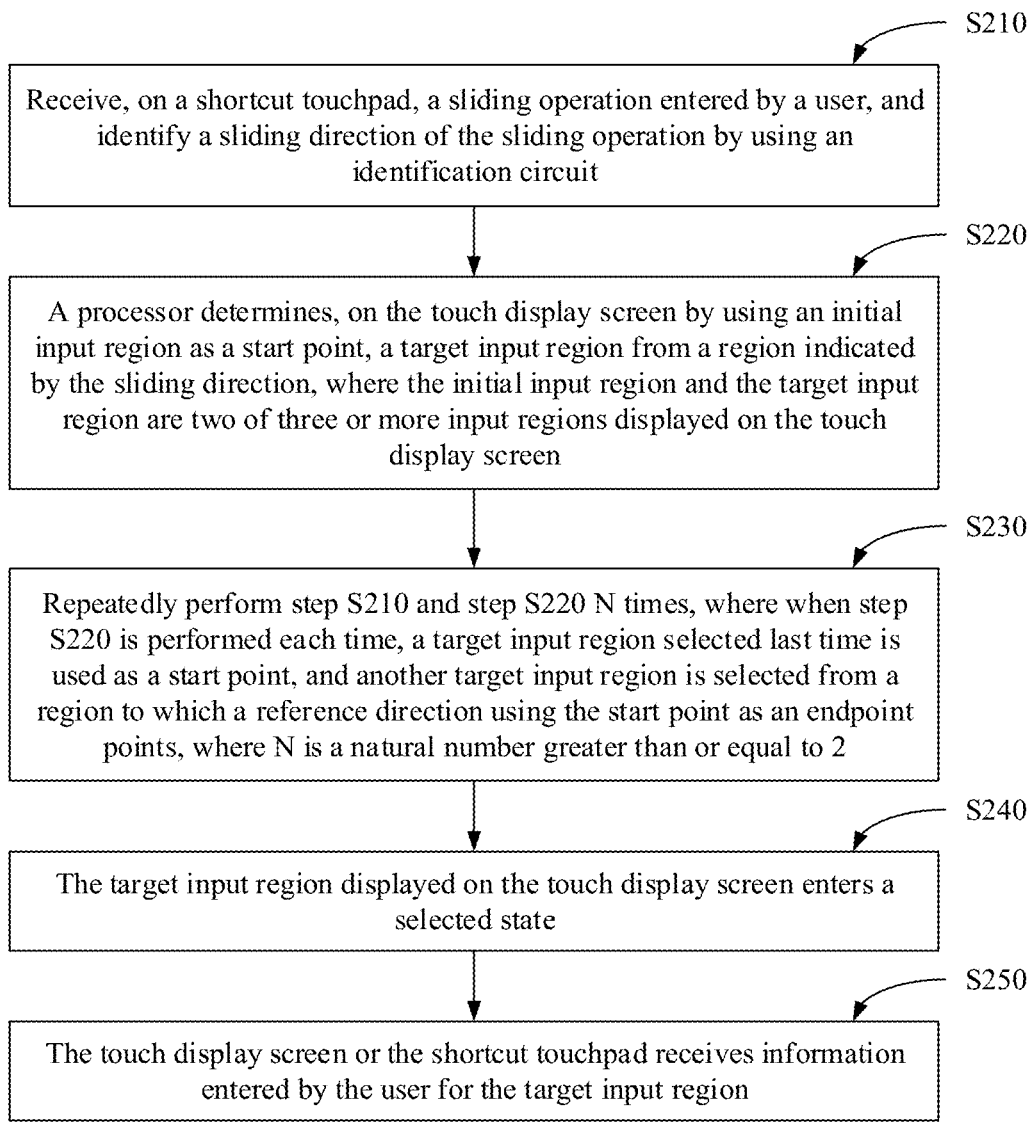
FIG. 11 is a flowchart of an embodiment of a second touch display screen operation method according to this application.

As shown in FIG. 11, this application further provides a second touch display screen operation method. The method includes the following operations.

S210. Receive, on a shortcut touchpad, a sliding operation entered by a user, and identify a sliding direction of the sliding operation by using an identification circuit.

S220. A processor determines, on the touch display screen by using an initial input region as a start point, a target input region from a region indicated by the sliding direction, where the initial input region and the target input region are two of three or more input regions displayed on the touch display screen.

S230. Repeatedly perform operation S210 and operation S220 N times, where when operation S220 is performed for the first time, a specified input region is used as a start point, and a target input region is selected from a region to which a reference direction using the start point as an endpoint points, and when operation S220 is performed for the second time and each time after the second time, a target input region selected last time is used as a start point, and another target input region is selected from a region to which a reference direction using the start point as an endpoint points, where N is a natural number greater than or equal to 2.

S240. The target input region displayed on the touch display screen enters a selected state.

S250. The touch display screen or the shortcut touchpad receives information entered by the user for the target input region.

In the foregoing embodiment, for the embodiments of operations S210 and S220, refer to various embodiments of operations S110 and S120 of the first touch display screen display operation method. A definition of the initial input region is the same as that of the first input region, and a definition of the target input region is the same as that of the second input region.

In the foregoing embodiment, operation S240 may include: enabling, by the touch display screen according to an instruction of the processor, the target input region to enter the selected state.

In an embodiment of the second touch display screen operation method provided in this application, the identification circuit may be integrated with the processor, or the identification circuit is integrated with the shortcut touchpad.

Figure 12:
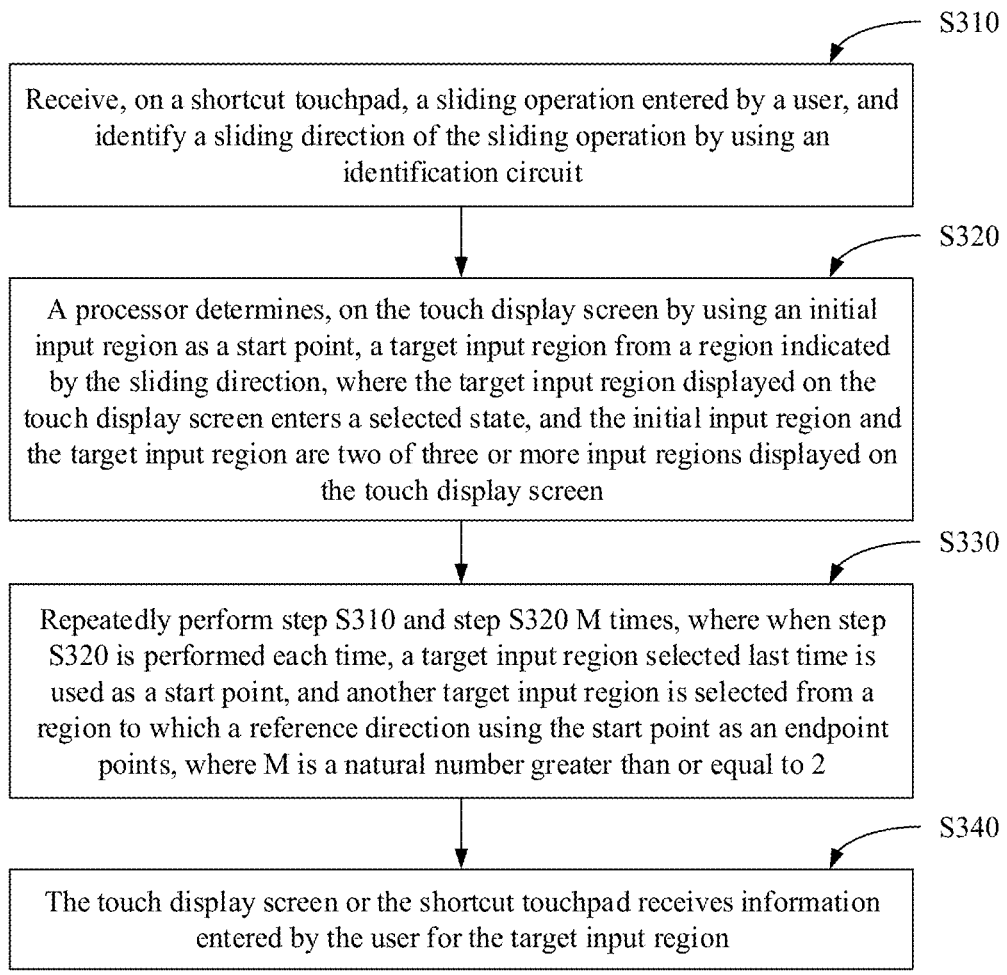
FIG. 12 is a flowchart of an embodiment of a third touch display screen operation method according to this application.

As shown in FIG. 12, this application further provides a third touch display screen operation method. The method includes the following operations.

S310. Receive, on a shortcut touchpad, a sliding operation entered by a user, and identify a sliding direction of the sliding operation by using an identification circuit.

S320. A processor determines, on the touch display screen by using an initial input region as a start point, a target input region from a region indicated by the sliding direction, where the target input region displayed on the touch display screen enters a selected state, and the initial input region and the target input region are two of three or more input regions displayed on the touch display screen.

S330. Repeatedly perform operation S310 and operation S320 M times, where when operation S320 is performed for the first time, a specified input region is used as a start point, and a target input region is selected from a region to which a reference direction using the start point as an endpoint points, and when operation S320 is performed for the second time and each time after the second time, a target input region selected last time is used as a start point, and another target input region is selected from a region to which a reference direction using the start point as an endpoint points, where M is a natural number greater than or equal to 2.

S340. The touch display screen or the shortcut touchpad receives information entered by the user for the target input region.

In the foregoing embodiment, for embodiments of operations S310 and S320, refer to various embodiments of operations S110 and S120 of the first touch display screen display operation method. A definition of the initial input region is the same as that of the first input region, and a definition of the target input region is the same as that of the second input region.

In the foregoing embodiment, in operation S320, that the target input region displayed on the touch display screen enters a selected state may include: enabling, by the touch display screen according to an instruction of the processor, the target input region to enter the selected state.

In an embodiment of the third touch display screen operation method provided in this application, the identification circuit may be integrated with the processor, or the identification circuit is integrated with the shortcut touchpad.

The second and third touch display screen operation methods are specific to a case in which a user selects a target input region after a plurality of selections. In the two cases, the user enters a plurality of sliding operations.

In the first, second, and third touch display screen display operation methods, the sliding operation entered by the user may be in the following three forms:

First form: The sliding operation slides along a curve or a straight line. There is no pause or turning point during the sliding, and a contact does not leave an effective sensing range of the shortcut touchpad during the sliding. A direction of a connection line from a start point to an end point of the sliding operation is the sliding direction.

Second form: The sliding operation slides along a curve, a straight line, or a broken line. There is no pause during the sliding, and a contact does not leave an effective sensing range of the shortcut touchpad during the sliding. A direction of a connection line from a start point to an end point of the sliding operation is the sliding direction.

Third form: The sliding operation slides along a curve, a straight line, or a broken line. There is a pause during the sliding, and a contact does not leave an effective sensing range of the shortcut touchpad during the sliding. A direction of a connection line from a start point to an end point of the sliding operation is the sliding direction.

The effective sensing range of the shortcut touchpad is a range in which the shortcut touchpad can receive a touch operation signal. The contact may enter touch operation information when being in contact with the shortcut touchpad. Alternatively, the contact may enter touch operation information when being at a specific distance from the shortcut touchpad. The effective sensing range may include a surface of the shortcut touchpad, and may further include a space range with a specific distance from the surface of the shortcut touchpad.

A turning point of a line drawn in the sliding operation, a pause point of the sliding operation, or a location at which the contact leaves the effective sensing range of the shortcut touchpad may be identified as the end point of the sliding operation. Alternatively, in the sliding operation of the user, even if a turning point and a pause point appear, the turning point and the pause point may be ignored and not identified, but only a location at which the contact leaves the effective sensing range of the shortcut touchpad is identified, and the location at which the contact leaves the effective sensing range of the shortcut touchpad is used as the end point of the sliding operation. A location at which the contact enters the effective sensing range of the shortcut touchpad (for example, a location at which the contact gets in contact with the shortcut touchpad) may be used as the start point of the sliding operation.

For a plurality of consecutive sliding operations of the user, a turning point or a pause point that appears in the operations may be used as an end point of a previous sliding operation and a start point of a next sliding operation.

The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one of the following" or a similar expression thereof indicates any combination of the following, and includes any combination of one or more of the following. For example, at least one of a, b, or c may indicate: a, b, c, a-b, a-c, b-c, or a-b-c, where a, b, and c may be singular or plural.

In the descriptions of this application, it should be understood that directions or location relationships indicated by the terms such as "center", "up", "down", "front", "rear", "left", "right", "vertical", "horizontal", "top", "bottom", "inside", and "outside" are based on the directions or the location relationships shown in the accompanying drawings, and are merely intended to describe this application and simplify the descriptions, but not intended to indicate or imply that an indicated apparatus or component shall have a specific direction or be formed and operated in a specific direction, and therefore cannot be understood as a limitation on this application.

The terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method of operating a touch display screen of user equipment (UE), wherein the method comprises:
    activating, by the UE, a region on a touch display screen of the UE as a shortcut touchpad based on a trigger signal of a user and a holding gesture of the user;
    receiving, by the UE, a sliding operation entered by the user on the shortcut touchpad of the UE;
    identifying, by the UE, a sliding direction of the sliding operation;
    determining a reference direction on the touch display screen based on the sliding direction by the UE;
        wherein the touch display screen includes first rays and second rays, wherein endpoints of the first rays are located at a start point and on two sides of the reference direction and have a first included angle of x degrees with the reference direction, wherein endpoints of the second rays are located at the start point and on the two sides of the reference direction and have a second included angle of y degrees with the reference direction, wherein a region between a first ray and a second ray on the touch display screen is a second region, wherein the first ray and the second ray are located on a same side of the reference direction, wherein 0<x<45, 0<y<45, and x<y;
    determining by using a first input region as a start point, a second input region in an input region in the second region, wherein the second input region displayed on the touch display screen enters a selected state, wherein the first input region and the second input region are two of three or more input regions displayed on the touch display screen; and
    receiving information entered by the user for the second input region.

2. The method according to claim 1, wherein the touch display screen is integrated with the shortcut touchpad, and the shortcut touchpad is located in a region of a corner part of the touch display screen.

3. The method according to claim 2, wherein on the touch display screen, the first input region and the second input region are located in a region outside the shortcut touchpad.

4. The method according to claim 1, wherein determining the reference direction on the touch display screen based on the sliding direction comprises:
    identifying a third included angle between the sliding direction and a horizontal coordinate axis of the shortcut touchpad, and determining the reference direction based on the third included angle, wherein a magnitude of a fourth included angle between the reference direction and a horizontal coordinate axis of the touch display screen is equal to a magnitude of the third included angle between the sliding direction and the horizontal coordinate axis of the shortcut touchpad; or
    identifying a fifth included angle between the sliding direction and a vertical coordinate axis of the shortcut touchpad, and determining the reference direction based on the fifth included angle, wherein a magnitude of a sixth included angle between the reference direction and a vertical coordinate axis of the touch display screen is equal to a magnitude of the fifth included angle between the sliding direction and the vertical coordinate axis of the shortcut touchpad.

5. The method according to claim 1, wherein when the second input region is selected, the first input region is in a selected state, and the method further comprises:
    when or before the second input region is enabled to enter a selected state, enabling the first input region to enter a non-selected state.

6. The method according to claim 1,
    wherein a region between the first rays on the touch display screen is a first region, wherein the first included angle of x degree is bigger than 0 degree and smaller than 45 degrees; and
    wherein determining the second input region using the first input region as the start point comprises:
    determining the second input region in an input region in the first region.

7. The method according to claim 6, wherein determining the second input region in the first region comprises:
    when there is only one input region in the first region, determining the input region as the second input region.

8. The method according to claim 6, wherein determining the second input region in the first region comprises:
    when there are two or more input regions in the first region, determining an input region having a smallest included angle with the reference direction as the second input region, from the one or more input regions in the first region, wherein a seventh included angle between the input region and the reference direction is between the reference direction and a connection line from the start point to the input region.

9. User equipment, wherein the user equipment comprises:
    a shortcut touchpad, configured to receive a sliding operation entered by a user, wherein the shortcut touchpad is activated on a touch display screen of the user equipment based on a trigger signal of the user and a holding gesture of the user;

an identification circuit, configured to identify a sliding direction of the sliding operation; and a processor, configured to determine a reference direction on the touch display screen based on the sliding direction, on a touch display screen, wherein the touch display screen includes first rays and second rays, wherein endpoints of the first rays are located at a start point and on two sides of the reference direction and have a first included angle of x degrees with the reference direction, wherein endpoints of the second rays are located at the start point and on the two sides of the reference direction and have a second included angle of y degrees with the reference direction, wherein a region between a first ray and a second ray on the touch display screen is a second region, wherein the first ray and the second ray are located on a same side of the reference direction, wherein 0<x<45, 0<y<45, and x<y, and determine a second input region in an input region in the second region by using a first input region as a start point;

wherein the first input region and the second input region are two of three or more input regions displayed on the touch display screen;

wherein the touch display screen is further configured to display that the second input region enters a selected state; and wherein the touch display screen or the shortcut touchpad is further configured to receive information entered by the user for the second input region.

10. The user equipment according to claim 9, wherein the touch display screen is integrated with the shortcut touchpad, and the shortcut touchpad is located in a region of a corner part of the touch display screen.

11. The user equipment according to claim 10, wherein on the touch display screen, the first input region and the second input region are located in a region outside the shortcut touchpad.

12. The user equipment according to claim 9, wherein the processor is further configured to:

identify a third included angle between the sliding direction and a horizontal coordinate axis of the shortcut touchpad, and determine the reference direction based on the third included angle, wherein a magnitude of a fourth included angle between the reference direction and a horizontal coordinate axis of the touch display screen is equal to a magnitude of the third included angle between the sliding direction and the horizontal coordinate axis of the shortcut touchpad; or identify a fifth included angle between the sliding direction and a vertical coordinate axis of the shortcut touchpad, and determine the reference direction based on the fifth included angle, wherein a magnitude of a sixth included angle between the reference direction and a vertical coordinate axis of the touch display screen is equal to a magnitude of the fifth included angle between the sliding direction and the vertical coordinate axis of the shortcut touchpad.

13. The user equipment according to claim 9, wherein when the second input region is selected, and the first input region is in a selected state, the processor is further configured to: when or before enabling the second input region to enter a selected state, enable the first input region to enter a non-selected state.

14. The user equipment according to claim 9, wherein a region between the first rays on the touch display screen is a first region, wherein 0<x<45; and wherein the processor is further configured to determine the second input region in an input region in the first region.

15. The user equipment according to claim 14, wherein the processor is further configured to: when there is only one input region in the first region, use the input region as the second input region.

16. The user equipment according to claim 14, wherein the processor is further configured to:

when there are two or more input regions in the first region, determine, as the second input region, an input region having a smallest included angle with the reference direction from the one or more input regions in the first region, wherein a seventh included angle between the input region and the reference direction is between the reference direction and a connection line from the start point to the input region.

17. A non-transitory computer-readable storage medium storing program instructions, which, when executed by a processor of user equipment (UE), cause the processor to:

activate a region on a touch display screen of the UE as a shortcut touchpad based on a trigger signal of a user and a holding gesture of the user;

receive a sliding operation entered by the user on a shortcut touchpad of the UE;

identify a sliding direction of the sliding operation;

determine, a reference direction on the touch display screen based on the sliding direction, on a touch display screen of the UE, wherein the touch display screen includes first rays and second rays, wherein endpoints of the first rays are located at a start point and on two sides of the reference direction and have a first included angle of x degrees with the reference direction, wherein endpoints of the second rays are located at the start point and on the two sides of the reference direction and have a second included angle of y degrees with the reference direction, wherein a region between a first ray and a second ray on the touch display screen is a second region, wherein the first ray and the second ray are located on a same side of the reference direction, wherein 0<x<45, 0<y<45, and x<y;

determine a second input region in an input region in the second region by using a first input region as a start point, wherein the second input region displayed on the touch display screen enters a selected state, wherein the first input region and the second input region are two of three or more input regions displayed on the touch display screen; and receive information entered by the user for the second input region.

* * * * *